(12) United States Patent
Nomura

(10) Patent No.: US 7,035,272 B2
(45) Date of Patent: Apr. 25, 2006

(54) METHOD AND APPARATUS FOR TRANSFERRING DATA, AND STORAGE MEDIUM

(75) Inventor: Takashi Nomura, Tokyo (JP)

(73) Assignee: Sony Corporation, Tokyo (JP)

( * ) Notice: Subject to any disclaimer, the term of this patent is extended or adjusted under 35 U.S.C. 154(b) by 762 days.

(21) Appl. No.: 09/782,287

(22) Filed: Feb. 14, 2001

(65) Prior Publication Data

US 2002/0009049 A1    Jan. 24, 2002

(30) Foreign Application Priority Data

Feb. 16, 2000   (JP) .............................. 2000-038871

(51) Int. Cl.
*H04L 12/28* (2006.01)
*H04J 3/22* (2006.01)
*H04J 3/06* (2006.01)

(52) U.S. Cl. .................... 370/412; 370/545; 370/401; 370/503

(58) Field of Classification Search ................ 370/229, 370/412, 428, 493, 401, 503, 516–518, 545, 370/540; 375/240.26, 240.28, 371–372
See application file for complete search history.

(56) References Cited

U.S. PATENT DOCUMENTS

| | | | | |
|---|---|---|---|---|
| 5,297,139 A | * | 3/1994 | Okura et al. ................ 370/428 |
| 5,566,174 A | * | 10/1996 | Sato et al. .................. 370/468 |
| 5,948,080 A | * | 9/1999 | Baker ......................... 710/37 |
| 6,026,080 A | * | 2/2000 | Roy ............................ 370/260 |
| 6,032,261 A | * | 2/2000 | Hulyalkar ................... 713/400 |
| 6,061,399 A | * | 5/2000 | Lyons et al. ........... 375/240.26 |
| 6,128,318 A | * | 10/2000 | Sato ........................... 370/503 |
| 6,243,395 B1 | * | 6/2001 | Fujimori et al. ............ 370/466 |
| 6,330,286 B1 | * | 12/2001 | Lyons et al. ........... 375/240.26 |
| 6,434,146 B1 | * | 8/2002 | Movshovich et al. ....... 370/394 |
| 6,523,696 B1 | * | 2/2003 | Saito et al. ................. 709/223 |
| 6,542,506 B1 | * | 4/2003 | Lee ............................. 370/401 |
| 6,661,811 B1 | * | 12/2003 | Baker ......................... 370/516 |
| 6,813,282 B1 | * | 11/2004 | Domon ....................... 370/516 |
| 6,888,840 B1 | * | 5/2005 | Ramaswamy et al. ..... 370/412 |
| 2002/0131443 A1 | * | 9/2002 | Robinett et al. ............ 370/442 |

FOREIGN PATENT DOCUMENTS

EP             841833 A2 *   5/1998

* cited by examiner

*Primary Examiner*—Steven Nguyen
(74) *Attorney, Agent, or Firm*—Oblon, Spivak, McClelland, Maier & Neustadt, P.C.

(57) ABSTRACT

Data is transferred between a plurality of networks which are not synchronized in clock with each other, without creating either an overflow or an underflow. Data output from a first DVCR is transferred to a second DVCR via a first IEEE-1394 serial bus, a first ATM/IEEE-1394 data transfer apparatus, a first UNI, a first ATM network, an NNI 101, a second ATM network, a second UNI, a second ATM/IEEE-1394 data transfer apparatus, and a second IEEE-1394 serial bus. The second ATM/IEEE-1394 data transfer apparatus stores data in a buffer for each flow and deletes or inserts an empty packet depending upon the amount of data stored in the buffer so as to prevent an overflow and an underflow. A deviation of a time stamp caused by the insertion or the deletion of the empty packet is gradually corrected.

16 Claims, 18 Drawing Sheets

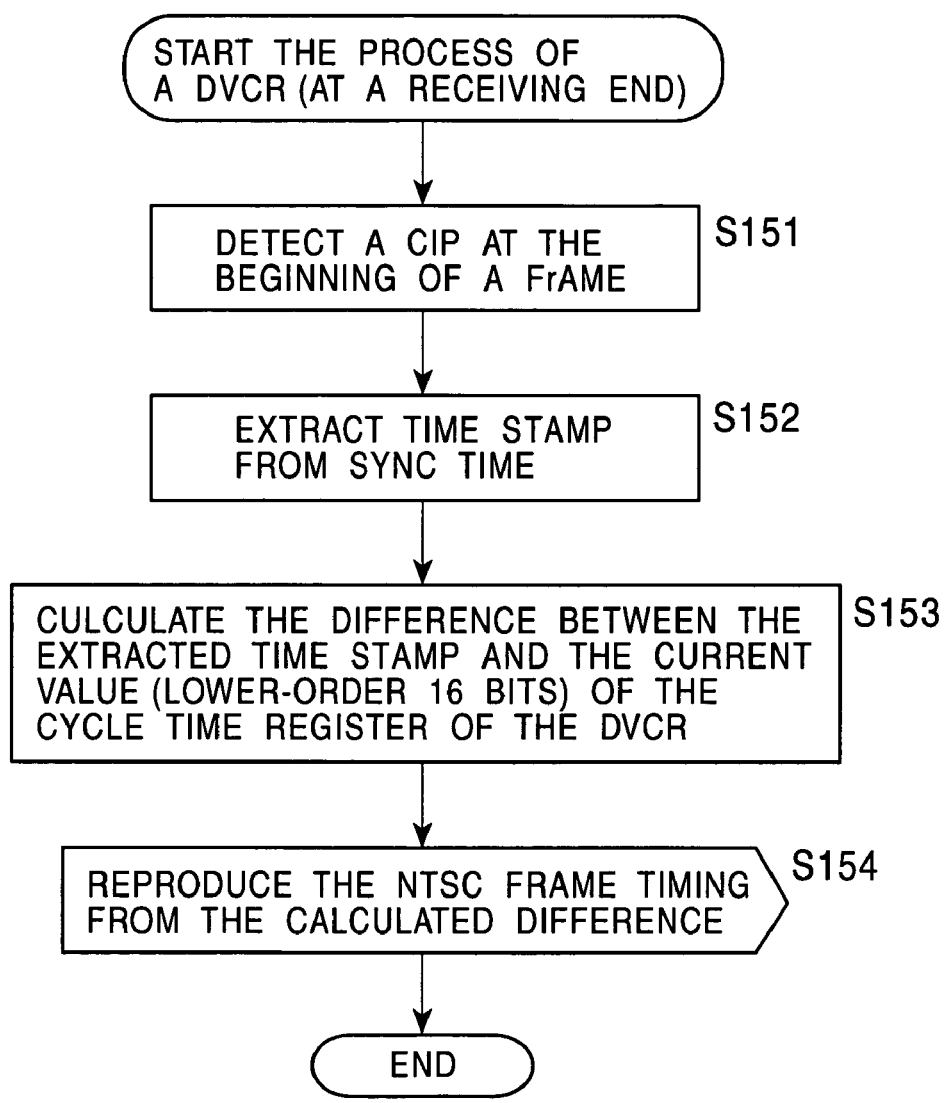

METHOD AND APPARATUS FOR TRANSFERRING DATA, AND STORAGE MEDIUM

FIELD OF THE INVENTION

The present invention relates to a data transfer apparatus, a data transfer method, and a storage medium, and more particularly to a data transfer apparatus, a data transfer method, and a storage medium, capable of transmitting and receiving continuous motion image data between networks which are not synchronized in clock with each other without creating a loss of data.

DESCRIPTION OF THE RELATED ART

FIG. 1 illustrates an example of a configuration of a conventional network system. In this network system, a digital video cassette recorder (DVCR) 11 is connected to an IEEE-1394 high-speed serial bus (hereinafter also referred to simply as an IEEE-1394 serial bus) which is connected to an ATM network 15 via an ATM (Asynchronous Transfer Mode)/IEEE-1394 data transfer apparatus 13 and a UNI (User Network Interface) 14. The ATM network 15 is further connected to an ATM/IEEE-1394 data transfer apparatus 17 via a UNI 16, and a DVCR 19 is connected to the ATM/IEEE-1394 data transfer apparatus 17 via an IEEE-1394 serial bus 18.

The IEEE-1394 serial bus 12 (and also the IEEE-1394 serial bus 18) transfers data in such a manner as shown in FIG. 2. That is, a source packet (FIG. 2(A)) of data transmitted from the DVCR 11 is divided into data blocks each consisting of 480 bytes (FIG. 2(B)). Each data block is added with an isochronous packet header and a CIP (Common Isochronous Packet) header and transmitted as an isochronous packet in a particular cycle with a period of 125 μsec.

At the beginning of each cycle, a cycle start packet is transmitted from a cycle master formed of particular parts in a device connected to the IEEE-1394 serial bus 12. In order to achieve synchronization on the IEEE-1394 serial bus 12, each device connected to the IEEE-1394 serial bus has a cycle time register. The value of cycle time data in the cycle start packet synchronized with a 24.576 MHz reference clock signal generated by the cycle master (hereinafter also referred to simply as a reference clock signal) is reflected in the value of the cycle time register in each device so as to synchronize the value of the cycle time register every 125 μs. Thus, the ATM/IEEE-1394 data transfer apparatus 13 performs the operation of interfacing with the IEEE-1394 serial bus 12 while maintaining synchronization of the value of the cycle time register.

After being processed by the IEEE-1394 interface unit, the packet data is converted into an ATM cell by an ATM interface unit in the ATM/IEEE-1394 data transfer apparatus 13 and transmitted to the ATM network 15. In order to achieve synchronization among respective devices connected to the ATM network 15, the ATM network 15 operates synchronously with a reference clock signal at a frequency of 8 KHz (hereinafter also referred to as an ATM reference clock signal). That is, the ATM interface unit in the ATM/IEEE-1394 data transfer apparatus 13 performs various operations in synchronization with the ATM reference clock signal.

The ATM cell transmitted from the ATM/IEEE-1394 data transfer apparatus 13 via the ATM network 15 is supplied to the ATM/IEEE-1394 data transfer apparatus 17 via the UNI 16. The ATM interface unit of the ATM/IEEE-1394 data transfer apparatus 17 assembles received ATM cells and supplies the resultant data to the IEEE-1394 interface unit. The ATM interface unit also operates in synchronization with the ATM reference clock signal of the ATM network 15. The data output from the ATM interface unit is converted into packets by the IEEE-1394 interface unit and supplied to the DVCR 19 via the IEEE-1394 serial bus 18. The IEEE-1394 interface unit of the ATM/IEEE-1394 data transfer apparatus 17 operates while synchronizing the value of the cycle time register so as to achieve synchronization among the respective devices connected to the IEEE-1394 serial bus.

FIG. 3 is a timing chart illustrating the principles of the operation performed by the DVCR 11 to transfer data, via the IEEE-1394 serial bus 12 and further via the ATM network 15, to the DVCR 19 connected to the IEEE-1394 serial bus 18. In the case where the DVCR 11 outputs image data according to the NTSC standard, a 29.97 MHz frame synchronization signal is sampled in response to a 24.576 MHz bus reference clock signal at, for example, times t1, t4, and t7 (FIG. 3(A)).

Image data captured at a time t1 is transmitted, in a bus cycle starting at the time t1, from the DVCR 11 to the IEEE-1394 serial bus 12. The CIP packet CIP1 transmitted in the above transmission process includes a time stamp added thereto (FIG. 3(B)).

That is, as shown in FIG. 4, an isochronous packet transmitted via the IEEE-1394 serial bus consists of an IEEE-1394 header, a CIP header 1, a CIP header 2, and data, wherein 16-bit time information (sync time) is disposed as a time stamp in the CIP header 2. Each device connected to the IEEE-1394 serial bus 12 has a cycle time register to achieve synchronization on the bus, wherein the value of the time stamp is described in low-order 16 bits in the cycle time register. The value of the time stamp of the CIP packet CIP1 is set to be equal to the sum of the value of the cycle time register at a sampling time (time t1) and an added delay time TdelayAddCount. That is, the time stamp has a value corresponding to a time t3 that is later than the time t1 by the added delay time TdelayAddCount. The added delay time TdelayAddCount is set to a value which allows absorption of jitter such as a deviation of the cycle timing of the IEEE-1394 serial bus 12.

When the DVCR 19 receives this CIP packet CIP1 via the IEEE-1394 serial bus 18 at the receiving end, the DVCR 19 extracts the time stamp included in the CIP packet CIP1 (FIG. 3(C)). As described above, the time indicated by the time stamp corresponds to the time t3. Thus, at the time t3, the DVCR 19 generates a frame synchronization signal for a first frame. Thereafter, similar processing is performed for a second frame, a third frame, and so on.

The timing chart shown in FIG. 3 illustrates the basic principles of the operation. FIG. 5 shows a timing chart of a practical operation. In FIG. 5, at a time t2, a frame synchronization signal associated with a first frame captured at a time t1 is transmitted to the IEEE-1394 serial bus 12 as a CIP packet CIP1 including a time stamp corresponding to a time t3 that is later than the sampling time by the added delay time TdelayAddCount. This CIP packet CIP1 is supplied to the DVCR 19 at the beginning of a bus cycle starting at a time t4 that is later than the time t2 by a total delay time TdelayNet1 which occurs during transmission via the IEEE-1394 serial bus 12, the ATM/IEEE-1394 data transfer apparatus 13, the UNI 14, the ATM network 15, the UNI 16, the ATM/IEEE-1394 data transfer apparatus 17, and the IEEE-1394 serial bus 18. The DVCR 19 extracts the time stamp from the CIP packet CIP1 (FIG. 5(C)) and generates a synchronization signal for a first frame at a time t6 corresponding to the extracted time stamp (FIG. 5(D)).

In accordance with the time stamp extracted from the CIP packet CIP1 by the DVCR 19 connected to the IEEE-1394 serial bus at the receiving end, the lapse of time ToffsetAddCount #2 from t4 to t6 is counted using the bus reference clock signal of the IEEE-1394 serial bus 18. On the other hand, the time t3 set in the time stamp in the CIP packet CIP1 by the DVCR 11 connected to the IEEE-1394 serial bus 12 at the transmitting end corresponds to a time that is later than the starting time t2 of a bus cycle by ToffsetAddCount #1 counted using the bus reference clock of the IEEE-1394 serial bus 12 (FIG. 5(B)). The time period ToffsetAddCount #1 corresponds to the difference between the times t3 and t2 (that is, the difference between the times t5 and t4 wherein the time t5 is a time that is later than the time t3 by TdelayNet1 and the time t4 is a time that is later than the time t2 by TdelayNet1) (FIG. 5(B)).

Because the bus reference clock of the IEEE-1394 serial bus 12 at the transmitting end and the bus reference clock of the IEEE-1394 serial bus 18 at the receiving end are not synchronized with each other, the cycle period (FIG. 5(B)) of the IEEE-1394 serial bus 12 and the cycle period (FIG. 5(C)) of the IEEE-1394 serial bus 18 are not exactly coincident with each other. As a result, a difference occurs between a frame period TsndFrame from t3 to t9 (FIG. 5(B)) on the IEEE-1394 serial bus 12 and a frame period TrevFrame from (FIG. 5(D)) on the IEEE-1394 serial bus 18.

The above difference results in a slight difference in color between an image transmitted from the DVCR 11 and an image reproduced by the DVCR 19. For the same reason, a difference occurs in sound between the transmitting and receiving ends.

Such a bus cycle time deviation can cause an overflow or underflow of the buffer of the ATM/IEEE-1394 data transfer apparatus at the receiving end. Whether an overflow or an underflow occurs is determined by a relative relation between the bus cycles at the transmitting and receiving ends. More specifically, when the bus cycle at the transmitting end is shorter than that at the receiving end, an overflow occurs, while an underflow occurs when the bus cycle at the transmitting end is longer than that at the receiving end. In the specific example shown in the timing chart of FIG. 5, the bus cycle at the transmitting end is shorter than that at the receiving end. In this case, the cumulative delay time gradually increases, and the number of packets staying in the ATM/IEEE-1394 data transfer apparatus 17 increases.

The time when an overflow occurs can be calculated as follow. Let us assume herein that the capacity of a buffer of the ATM/IEEE-1394 data transfer apparatus 17 is 16 Mbytes and that the relative difference between reference clocks is 30 ppm (which is a typical difference between clock signals generated by voltage controlled crystal oscillators). The length of a packet is 3072 when it is represented in units of cycle time register value. Thus, the length of time Tcip during which one CIP packet stays in the buffer is given by $$Tcip = 3072/(24.576 \times 30)$$
$$= 4.17 \text{ sec}$$

The length of time Tover required for the buffer having a capacity of 16 Mbytes (16777216 bytes) to encounter an overflow is given by $$Tover = Tcip \times 16777216/488 = 143248 \text{ sec} = 39.8 \text{ hours}$$

Thus, the 16 Mbyte buffer encounters an overflow in about 40 hours.

The time in which an underflow occurs depends upon the number of CIP packets which are temporarily stored in the buffer to absorb jitter. The time in which an underflow occurs can be increased by increasing the number of packets stored in the buffer. However, the increase in the number of packets stored in the buffer results in an increase in delay time which occurs in the ATM/IEEE-1394 data transfer apparatus 17. Conversely, the delay time can be reduced by reducing the number of packets stored in the buffer. However, in this case, an underflow occurs in a shorter time. More specifically, the time in which an underflow occurs can be calculated as follows. If we assume herein that the number of CIP packets stored in the buffer is equal to, for example, 2400 (thus, the delay time is given as 125 μs×2400=300 ms which is an upper limit allowed in real-time applications) and that the relative difference between the reference clocks is 30 ppm, then the time Tcip during which one CIP packet stays in the buffer before it is output is given by $$Tcip = 3072/(24.576 \times 30)$$
$$= 4.17 \text{ sec}$$

The time Tunder in which the buffer storing CIP packets encounters an underflow is given by $$Tunder = Tcip \times 2400 = 10008 \text{ sec} = 2.78 \text{ hours}$$

Thus, the buffer storing 2400 CIP packets encounters an underflow in about 3 hours.

To solve the above problem, the present applicant has proposed, in Japanese Patent Application No. 11-18065, a network system shown in FIG. 6. In the network system shown in FIG. 6, similar parts to those in FIG. 1 are denoted by similar reference numerals, and they are not described in further detail herein. The configuration of this system is basically similar to that of the system shown in FIG. 1 except that an ATM/IEEE-1394 data transfer apparatus 41 disposed between an IEEE-1394 serial bus 12 and an ATM network 15 and an ATM/IEEE-1394 data transfer apparatus 42 disposed between an ATM network 15 and an IEEE-1394 serial bus 18 are configured in different manners from corresponding devices in the system shown in FIG. 1.

More specifically, in the system shown in FIG. 6, the ATM/IEEE-1394 data transfer apparatus 41 serves as a cycle master of the IEEE-1394 serial bus 12, and the ATM/IEEE-1394 data transfer apparatus 42 serves as a cycle master of the IEEE-1394 serial bus 18, wherein IEEE-1394 bus reference clock generators 41A and 42A generate 24.576 MHz bus reference clock signals for use by the respective IEEE-1394 serial buses 12 and 18 in synchronization with an 8 KHz ATM reference clock signal (SDH frame pulse) generated by an ATM reference clock generator 15A of the ATM network 15.

The above configuration allows the clock signals for the IEEE-1394 serial buses 12 and 18 to be synchronous with each other, and thus it becomes possible to transfer packets without encountering an underflow or an overflow.

Some large-scale network systems include two or more ATM networks. In such a network system, for example, two ATM networks are connected to each other via an NNI (Network to Network Interface). However, an ATM clock reference for one ATM network and an ATM clock reference for the other ATM network are independent of each other, and they are not synchronous with each other.

Therefore, even if a clock signal of an IEEE-1394 serial bus connected to one ATM network is synchronous with the ATM clock reference thereof and if a clock signal of an IEEE-1394 serial bus connected to the other ATM network is synchronous with the ATM clock reference thereof, the clock signal of one IEEE-1394 serial bus and the clock signal of the other IEEE-1394 serial bus are not synchronous with each other. Thus, for example, when motion image data reproduced by a DVCR connected to one IEEE-1394 serial bus is transferred to a DVCR connected to the other IEEE-1394 serial bus via the two ATM networks, and the received motion image data is recorded by the DVCR connected to the other IEEE-1394 serial bus, an overflow or an underflow occurs and thus the motion image data is partially lost.

SUMMARY OF THE INVENTION

In view of the above, an object of the present invention is to provide a technique of preventing an overflow and an underflow thereby making it possible to transfer continuous data without generating a loss or excess of data.

According to an aspect of the present invention, there is provided a data transfer apparatus comprising: storage means for storing data separately for each data flow which has been received from the first network and which is to be transferred to the second network; detection means for detecting the amount of data stored in the storage means, for each data flow; and control means for controlling the data transferred to the second network in accordance with a detection result given by the detection means.

Preferably, the first network and the second network are a wide area digital network and an IEEE-1394 serial bus, respectively.

Preferably, the control means starts reading the data from the storage means after the amount of data stored in the storage means has become equal to or greater than a predetermined threshold value.

Preferably, when the amount of data stored in the storage means has become equal to or greater than a predetermined threshold value, the control means discards dummy data included in the data stored in the storage means.

Preferably, when the amount of data stored in the storage means has become equal to or greater than a predetermined threshold value, the control means inserts dummy data into the data to be transferred to the second network.

Preferably, when the control means discards dummy data from the data stored in the storage means or inserts dummy data into the data to be transferred to the second network, the control means gradually corrects a deviation of a time stamp included in the data over a predetermined period.

Preferably, the control means inserts or discards the dummy data at a substantially middle point of the period during which the time stamp is corrected.

The first network may be connected to another first network which is not synchronous in terms of a network clock with the former first network.

The data may be video data or audio data including a temporally continuous content.

According to another aspect of the present invention, there is provided a data transfer method comprising the steps of: controlling the operation of storing data separately for each data flow which has been received from a first network and which is to be transferred to a second network; detecting the amount of data stored in the storage control step, for each data flow; and controlling the operation of transferring the data to the second network in accordance with a detection result obtained in the detection step.

According to still another aspect of the present invention, there is provided a storage medium including a program stored thereon, the program comprising the steps of: controlling the operation of storing data separately for each data flow which has been received from a first network and which is to be transferred to a second network; detecting the amount of data stored in the storage control step, for each data flow; and controlling the operation of transferring the data to the second network in accordance with a detection result obtained in the detection step.

In the data transfer apparatus, data transfer method, and storage medium according to the present invention, data, which has been received from the first network and which is to be transferred to the second network is stored separately for each data flow and the transferring of the data to the second network is controlled in accordance with the amount of stored data for each data flow.

BRIEF DESCRIPTION OF THE DRAWING

FIG. 18 is a flow chart illustrating the operation of a DVCR 19-2 shown in FIG. 7.

DESCRIPTION OF THE PREFERRED EMBODIMENTS

Figure 7:
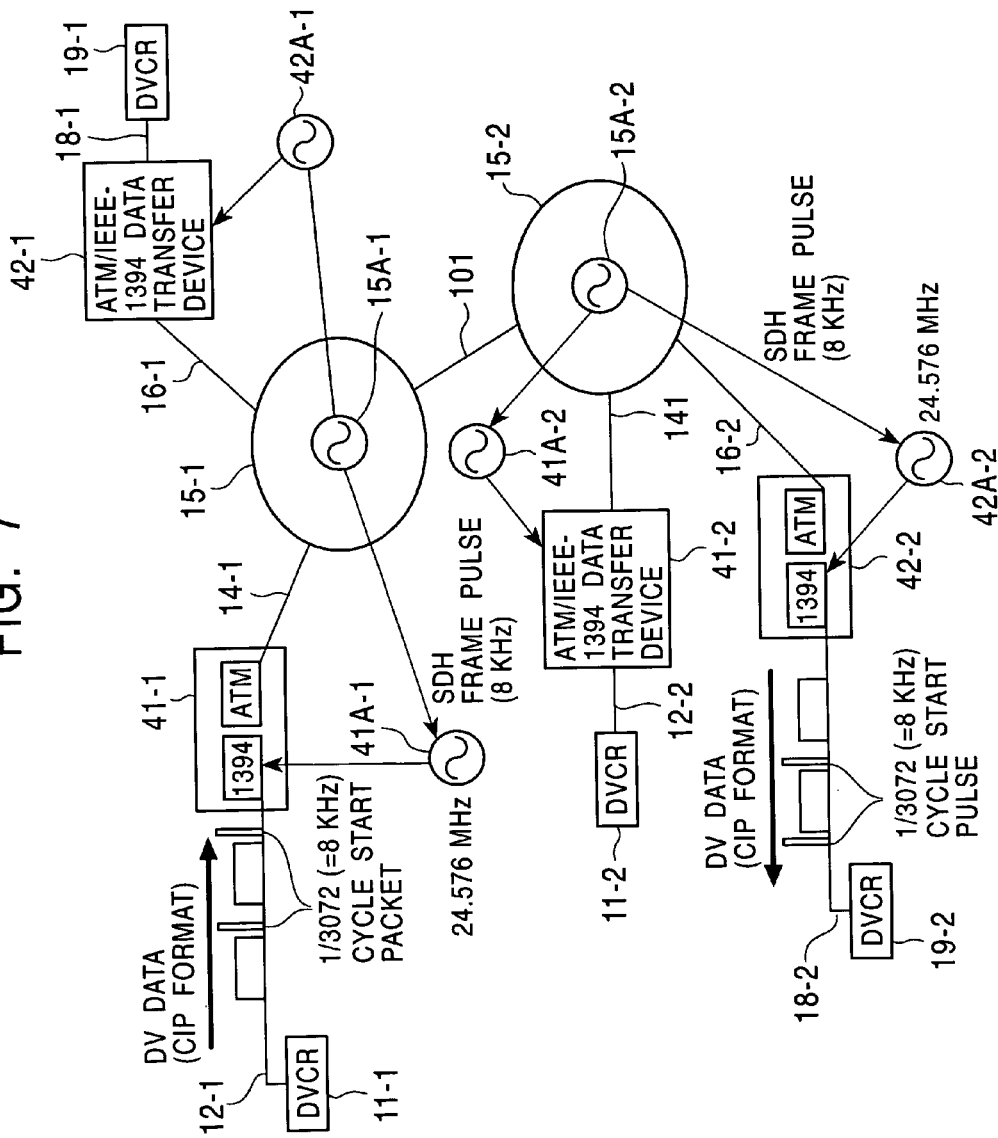
FIG. 7 is a schematic diagram illustrating an example of a configuration of a network system according to the present invention.

FIG. 7 illustrates a network system according to the present invention. In this network system, a digital video cassette recorder (DVCR) 11-1 is connected to an IEEE-1394 serial bus 12-1 which is connected to an ATM network 15-1 via an ATM (Asynchronous Transfer Mode)/IEEE-1394 data transfer apparatus 41-1 and a UNI (User Network Interface) 14-1. The ATM network 15-1 is further connected to an ATM/IEEE-1394 data transfer apparatus 42-1 via a UNI 16-1, and a DVCR 19-1 is connected to the ATM/IEEE-1394 data transfer apparatus 42-1 via an IEEE-1394 serial bus 18-1.

The ATM/IEEE-1394 data transfer apparatus 41-1 serves as a cycle master of the IEEE-1394 serial bus 12-1, and the ATM/IEEE-1394 data transfer apparatus 42-1 serves as a cycle master of the IEEE-1394 serial bus 18-1, wherein IEEE-1394 bus reference clock generators 41A-1 and 42A-1 generate 24.576 MHz bus reference clock signals for use by the respective IEEE-1394 serial buses 12-1 and 18-1 in synchronization with an 8 KHz ATM reference clock signal (SDH frame pulse) generated by an ATM reference clock generator 15A-1 of the ATM network 15-1.

Similarly, a digital video cassette recorder (DVCR) 11-2 is connected to an IEEE-1394 serial bus 12-2 which is connected to an ATM network 15-2 via an ATM/IEEE-1394 data transfer apparatus 41-2 and further via a UNI 14-2. The ATM network 15-2 is further connected to an ATM/IEEE-1394 data transfer apparatus 42-2 via a UNI 16-2, and a DVCR 19-2 is connected to the ATM/IEEE-1394 data transfer apparatus 42-2 via an IEEE-1394 serial bus 18-2.

The ATM/IEEE-1394 data transfer apparatus 41-2 serves as a cycle master of the IEEE-1394 serial bus 12-2, and the ATM/IEEE-1394 data transfer apparatus 42-2 serves as a cycle master of the IEEE-1394 serial bus 18-2, wherein IEEE-1394 bus reference clock generators 41A-2 and 42A-2 generate 24.576 MHz bus reference clock signals for use by the respective IEEE-1394 serial buses 12-2 and 18-2 in synchronization with an 8 KHz ATM reference clock signal (SDH frame pulse) generated by an ATM reference clock generator 15A-2 of the ATM network 15-2.

Two ATM networks 15-1 and 15-2 are connected to each other via an NNI (Network to Network Interface) 101. However, the ATM clock reference associated with the ATM network 15-1 and the ATM clock reference associated with the ATM network 15-2 are independent of each other, and they are not synchronous with each other.

Figure 8:
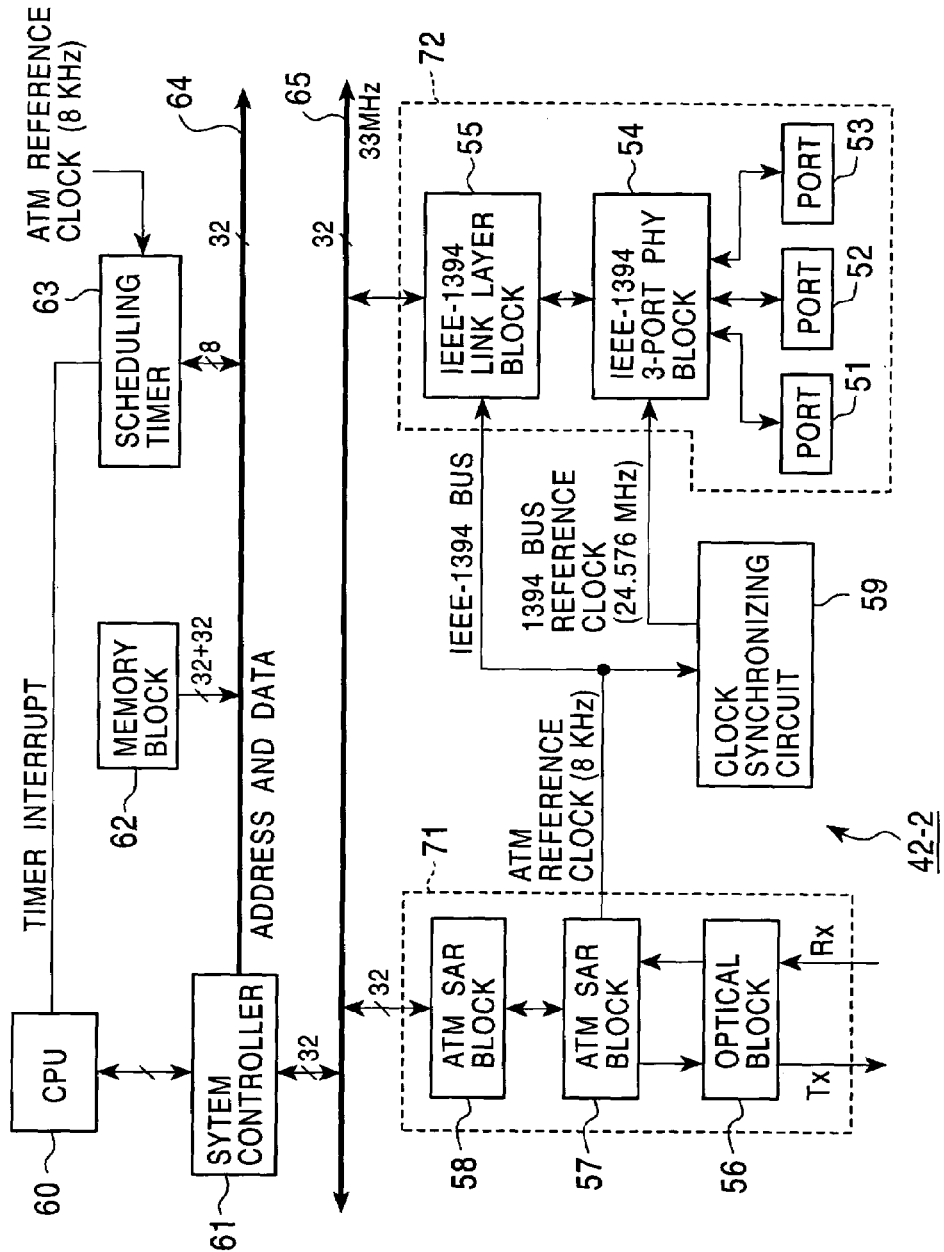
FIG. 8 is a block diagram illustrating a configuration of an ATM/IEEE-1394 data transfer apparatus 42-2 shown in FIG. 7.

FIG. 8 illustrates a configuration of the ATM/IEEE-1394 data transfer apparatus 42-2 (the ATM/IEEE-1394 data transfer apparatus 42-1, the ATM/IEEE-1394 data transfer apparatus 41-1, and the ATM/IEEE-1394 data transfer apparatus 41-2 are configured in a similar manner although they are not shown).

A CPU 60 executes an interfacing operation by controlling an ATM SAR (Segmentation and Reassembly) block 58, an ATM PHY block 57, an IEEE-1394 link layer block 55, an IEEE-1394 3-port PHY block 54, and a system controller 61.

A scheduling timer 63 performs frequency division upon the 8 KHz ATM reference clock (ATM/SDH frame timing signal) thereby outputting a timer interrupt signal to the CPU 60. A memory block 62 is connected to the system controller 61 via a local bus 64 and is used to store packet data to be transmitted and to store received packet data. The system controller 61 is also connected to a block 71 and a block 72, wherein the block 71 serves to transmit and receive data to and from the ATM network (ATM/SDH (Synchronous Digital Hierarchy) network) 15-2 via a PCI (Peripheral Component Interconnect) bus 65, and the block 72 serves to transmit and receive data to and from the IEEE-1394 serial bus 18-2. The block 71 includes the ATM SAR block 58, the ATM PHY block 57, and an optical block 56, and the block 72 includes the IEEE-1394 link layer block 55, and the IEEE-1394 3-port PHY block 54.

When the ATM SAR block 58 receives data from the memory block 62 via the system controller 61 and the PCI bus 65, the ATM SAR block 58 divides the received data into ATM cells and transmits the resultant ATM cells to the ATM PHY block 57. Conversely, when the ATM SAR block 58 receives ATM cells from the ATM PHY block 57, the ATM SAR block 58 assembles the received ATM cells and transmits the assembled data to the memory block 62 via the system controller 61 and the PCI bus 65. The ATM PHY block 57 converts ATM cells supplied from the ATM SAR block 58 into data which meets the specifications of the optical block 56 and outputs the resultant data to the optical block 56. Conversely, when the ATM PHY block 57 receives data from the optical block 56, the ATM PHY block 57 extracts, from the received data, ATM cells to be transferred to the ATM SAR block 58 and outputs the extracted ATM cells to the ATM SAR block 58. The optical block 56 receives data in the form of an optical signal from the ATM network 15-2 and converts the received data into an electrical signal. The resultant electrical signal is supplied to the ATM PHY block 57. On the other hand, when the optical block 56 receives data from the ATM PHY block 57, the optical block 56 converts the received data into an optical signal and outputs the resultant optical signal to the ATM network 15-2.

The IEEE-1394 link layer block 55 receives data in the ATM format from the memory block 62 via the system controller 61 and the PCI bus 65 and converts the received data into a format predefined for the IEEE-1394 serial bus using the CPU 60. The resultant data is output to the IEEE-1394 3-port PHY block 54. Conversely, when the IEEE-1394 link layer block 55 receives data in the format associated with the IEEE-1394 serial bus from the IEEE-1394 3-port PHY block 54, the IEEE-1394 link layer block 55 outputs the received data to the memory block 62 via the system controller 61 and the PCI bus 65. The data is then converted by the CPU 60 into the ATM format. The IEEE-1394 3-port PHY block 54 converts data received from the IEEE-1394 link layer block 55 into a signal in a form according to the IEEE-1394 serial bus standard and outputs the resultant signal to the IEEE-1394 serial bus 18-2 via one of ports 51 to 53. When the IEEE-1394 3-port PHY block 54 receives data from the IEEE-1394 serial bus 18-2 via one of ports 51 to 53, the IEEE-1394 3-port PHY block 54 transfers the received data to the IEEE-1394 link layer block 55.

The ATM PHY block 57 extracts an 8 KHz ATM reference clock signal. The extracted ATM reference clock signal is supplied to a clock synchronization circuit 59 and the IEEE-1394 link layer block 55. The IEEE-1394 link layer block 55 detects timing of transmitting a cycle start packet of an IEEE-1394 serial bus cycle in synchronization with the received ATM reference clock signal. The clock synchronization circuit 59 (corresponding to the bus reference clock generator 42A-2 shown in FIG. 7) generates a 24.576 MHz bus reference clock signal for use by the IEEE-1394 serial bus in synchronization with the ATM reference clock signal received from the ATM PHY block 57. The generated bus reference clock signal is output to the IEEE-1394 3-port PHY block 54.

Figure 9:
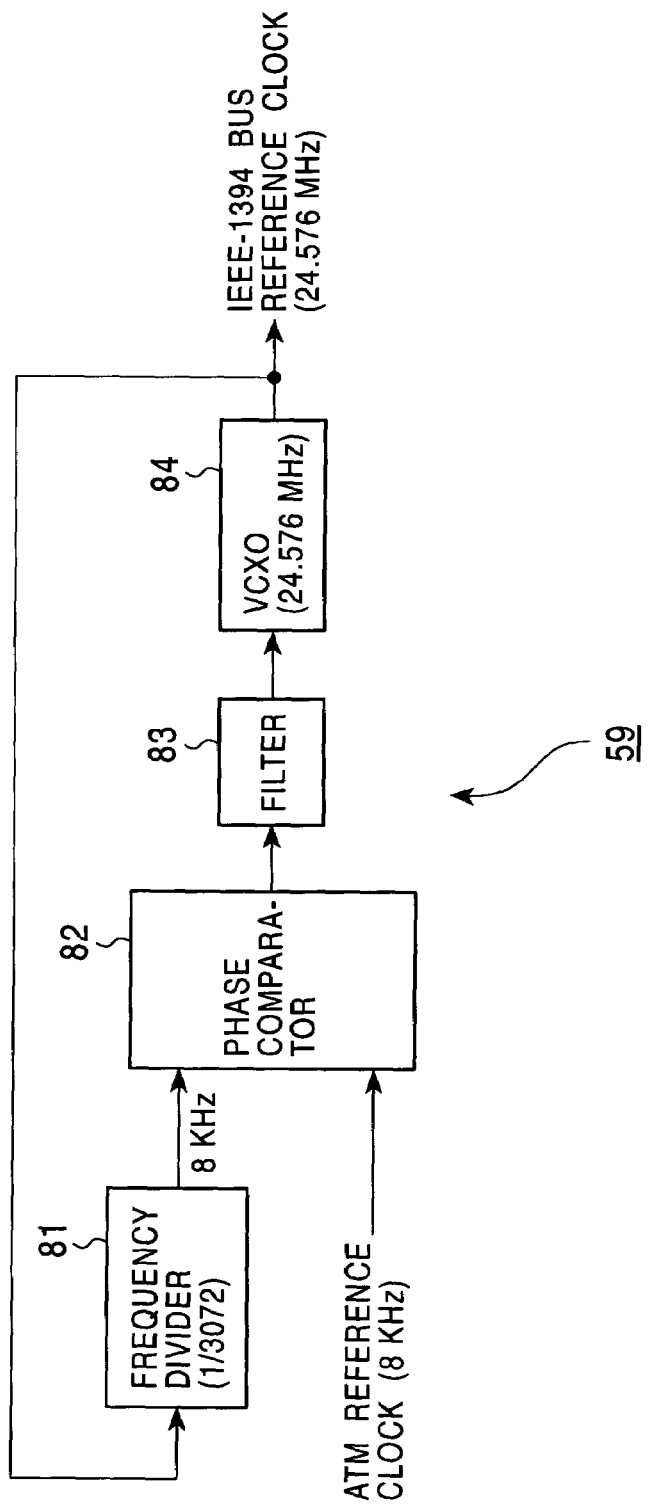
FIG. 9 is a block diagram illustrating a configuration of a clock synchronization circuit 59 shown in FIG. 8.

The clock synchronization circuit 59 is configured as shown in FIG. 9. That is, as shown in FIG. 9, the clock synchronization circuit 59 is configured in the form of a PLL circuit in which phase comparison is made between the 8 KHz ATM reference clock signal input from the ATM PHY block 57 and the 8 KHz clock signal input from a frequency divider 81, and a phase error signal is output to a filter (low-pass filter) 83. The filter 83 smoothes the received phase error signal and outputs the smoothed error signal to a voltage-controlled crystal oscillator (VCXO) 84. The voltage-controlled crystal oscillator 84 is set to oscillate at a nominal frequency of 24.576 MHz. The voltage-controlled crystal oscillator 84 generates a clock signal with a phase corresponding to a control signal (control voltage) input from the filter 83. The generated clock signal is output as the bus reference clock signal to the IEEE-1394 3-port PHY block 54. The bus reference clock signal output from the voltage-controlled crystal oscillator 83 is also input to the frequency divider 81, which divides the frequency of the input signal by 3072 and outputs the resultant signal to the phase comparator 82.

Thus, the clock synchronization circuit 59 generates and outputs the 24.576 MHz IEEE-1394 serial bus reference clock signal which has a higher accuracy (±10 ppm) than is recommended in the IEEE-1394 standard (±100 ppm) and which is synchronized with the 8 KHz ATM reference clock signal of the ATM network 15-2 input from the ATM PHY block 57.

The operation of transmitting and receiving data among devices is described below, for the case where digital video (DV) data is transmitted from the DVCR 11-1 connected to the IEEE-1394 serial bus 12-1 at the transmitting end to the DVCR 19-2 connected to the IEEE-1394 serial bus 18-2 at the receiving end.

Figure 10:
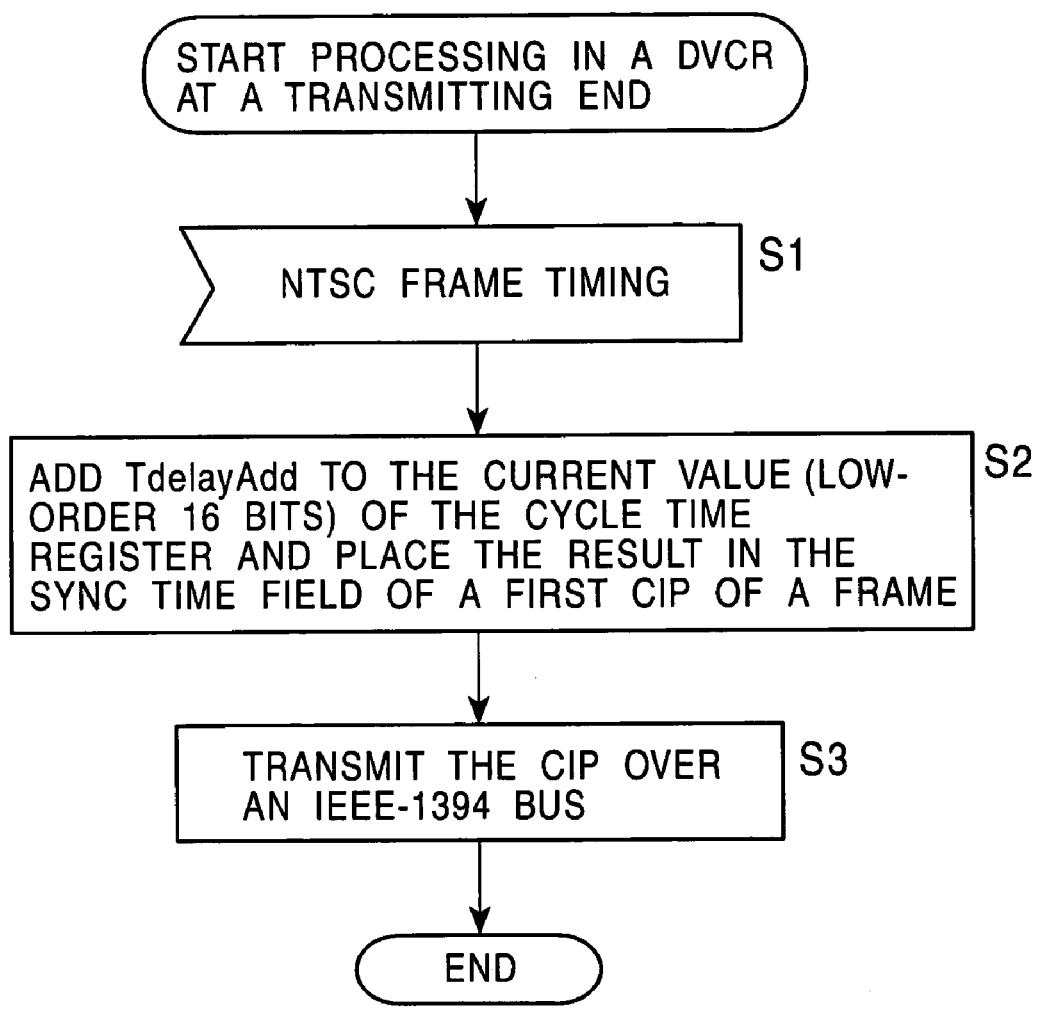
FIG. 10 is a flow chart illustrating the operation of a DVCR 11-1 shown in FIG. 7.

FIG. 10 is a flow chart illustrating the process performed by the DVCR 11-1 at the transmitting end. Herein, the DVCR 11-1 is assumed to sample a video signal according to the NTSC standard and outputs a resultant signal.

In step S1, the DVCR 11-1 samples, at a time t1, a 29.97 MHz frame synchronization signal in accordance with a 24.576 MHz clock signal generated by the DVCR 11-1. In the IEEE-1394 serial bus 12-1, because the ATM/IEEE-1394 data transfer apparatus 41-1 serves as the cycle master, the cycle time register of the DVCR 11-1 connected to the IEEE-1394 serial bus 12-1 has a value in which cycle time data included in a cycle start packet generated by the ATM/IEEE-1394 data transfer apparatus is reflected. The cycle time data is exactly equal to the value of the cycle time register of the ATM/IEEE-1394 data transfer apparatus 41-1 serving as the cycle master, wherein the value is counted in response to the bus reference clock signal. As a result, the value of the cycle time register of the DVCR 11-1 varies every 125 μs in synchronization with the value of the cycle time register of the ATM/IEEE-1394 data transfer apparatus 41-1.

Figure 1:
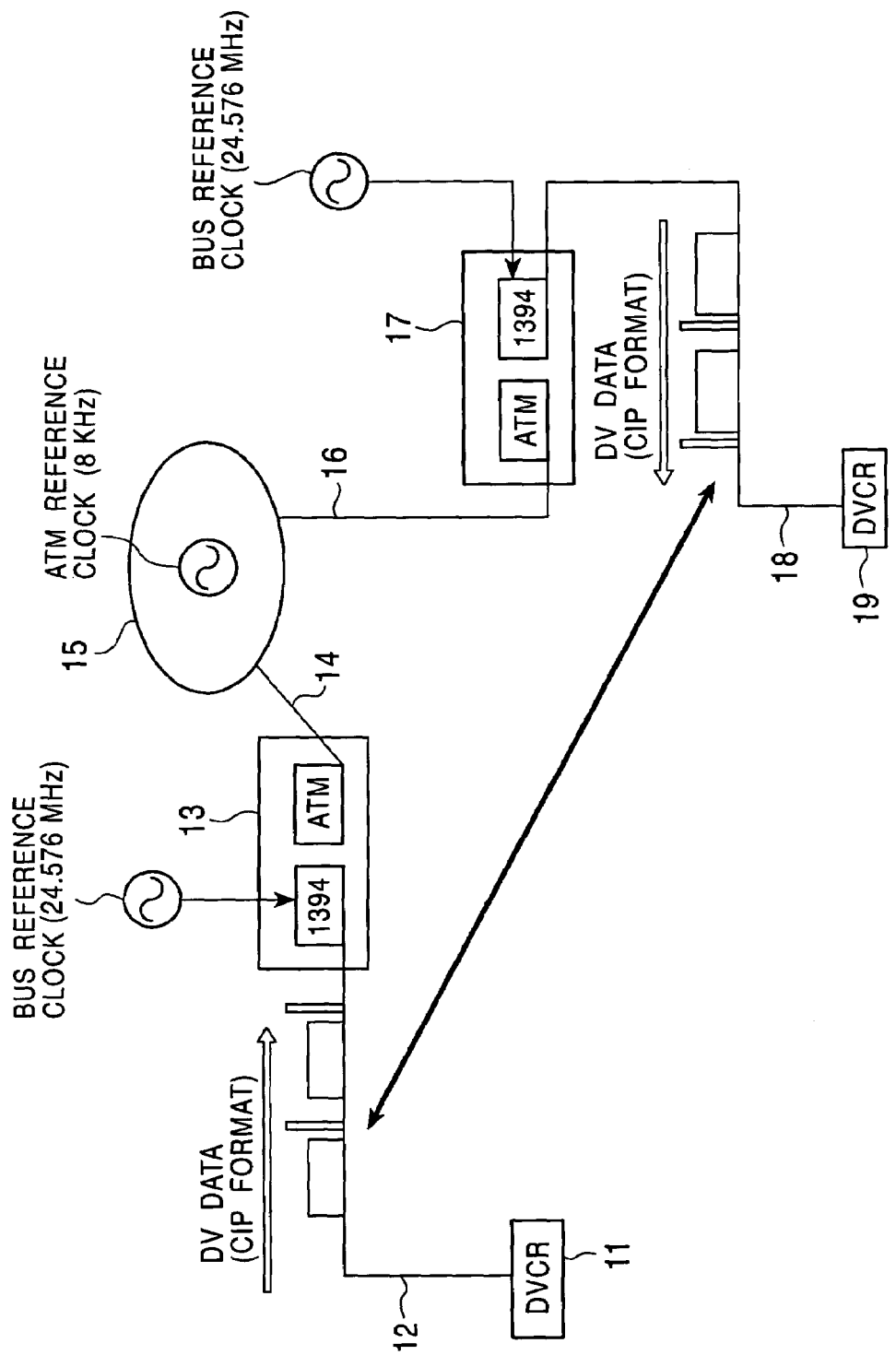
FIG. 1 is a schematic diagram illustrating a configuration of a conventional network system.
Figure 2:
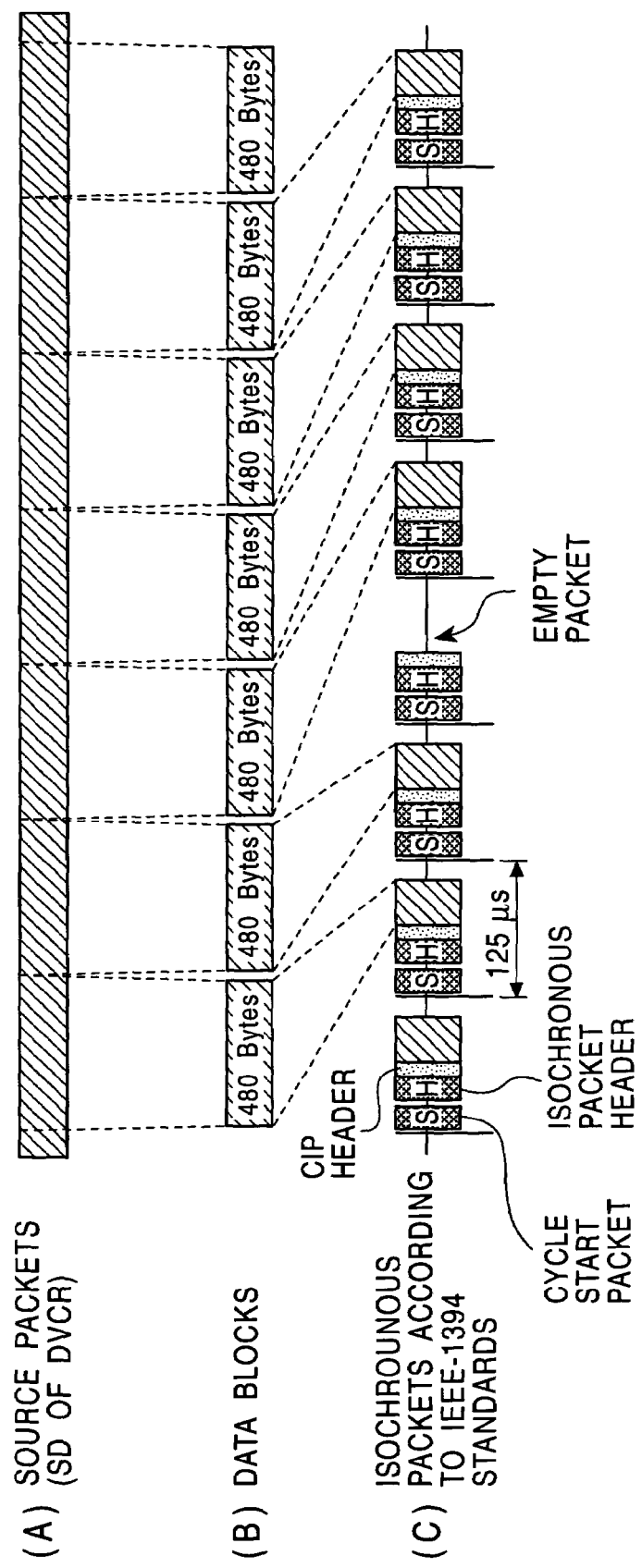
FIG. 2 is a schematic diagram illustrating transmission of an isochronous packet via an IEEE-1394 serial bus.
Figure 3:
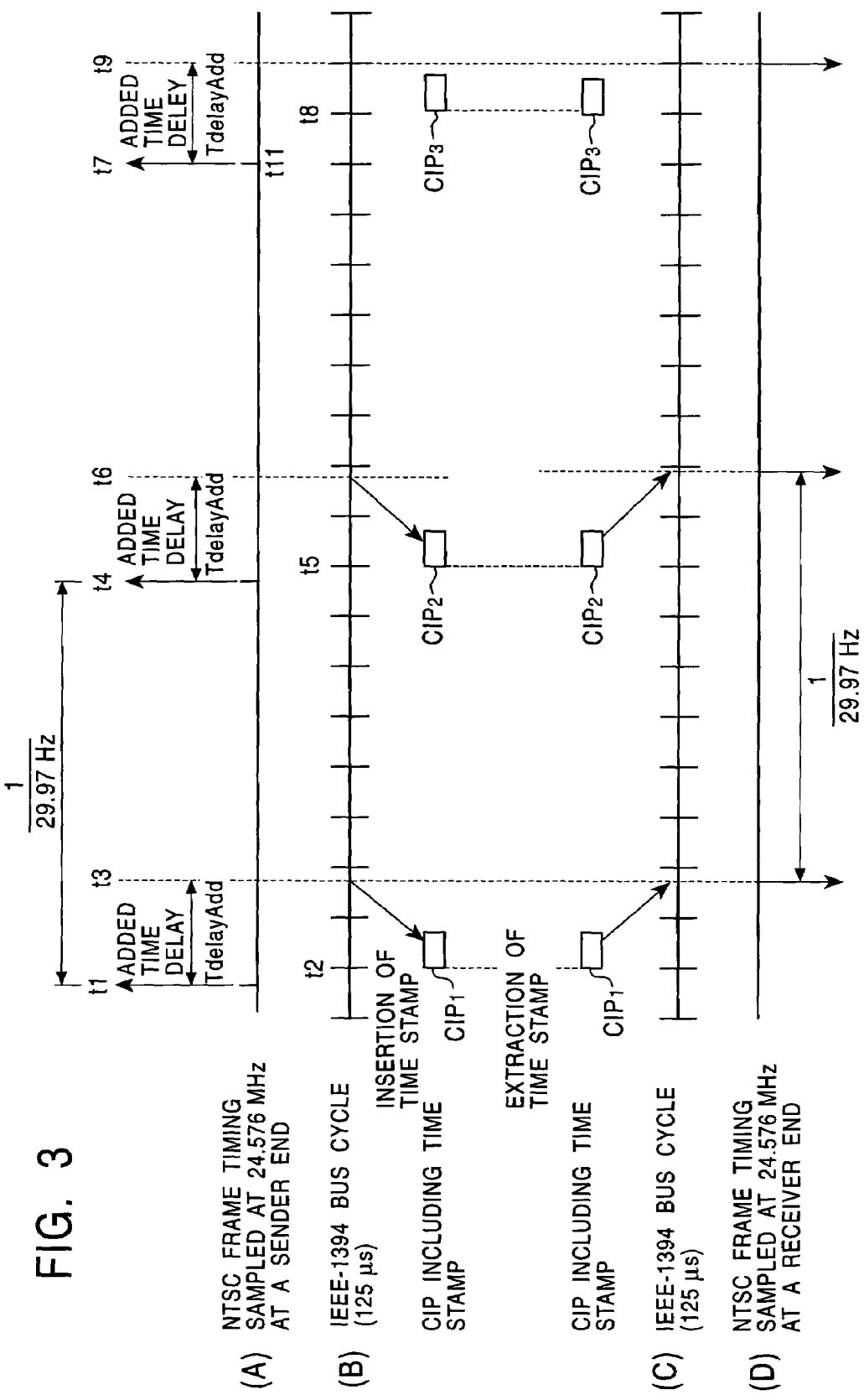
FIG. 3 is a timing chart illustrating the principles of the operation of the network system shown in FIG. 1.
Figure 4:
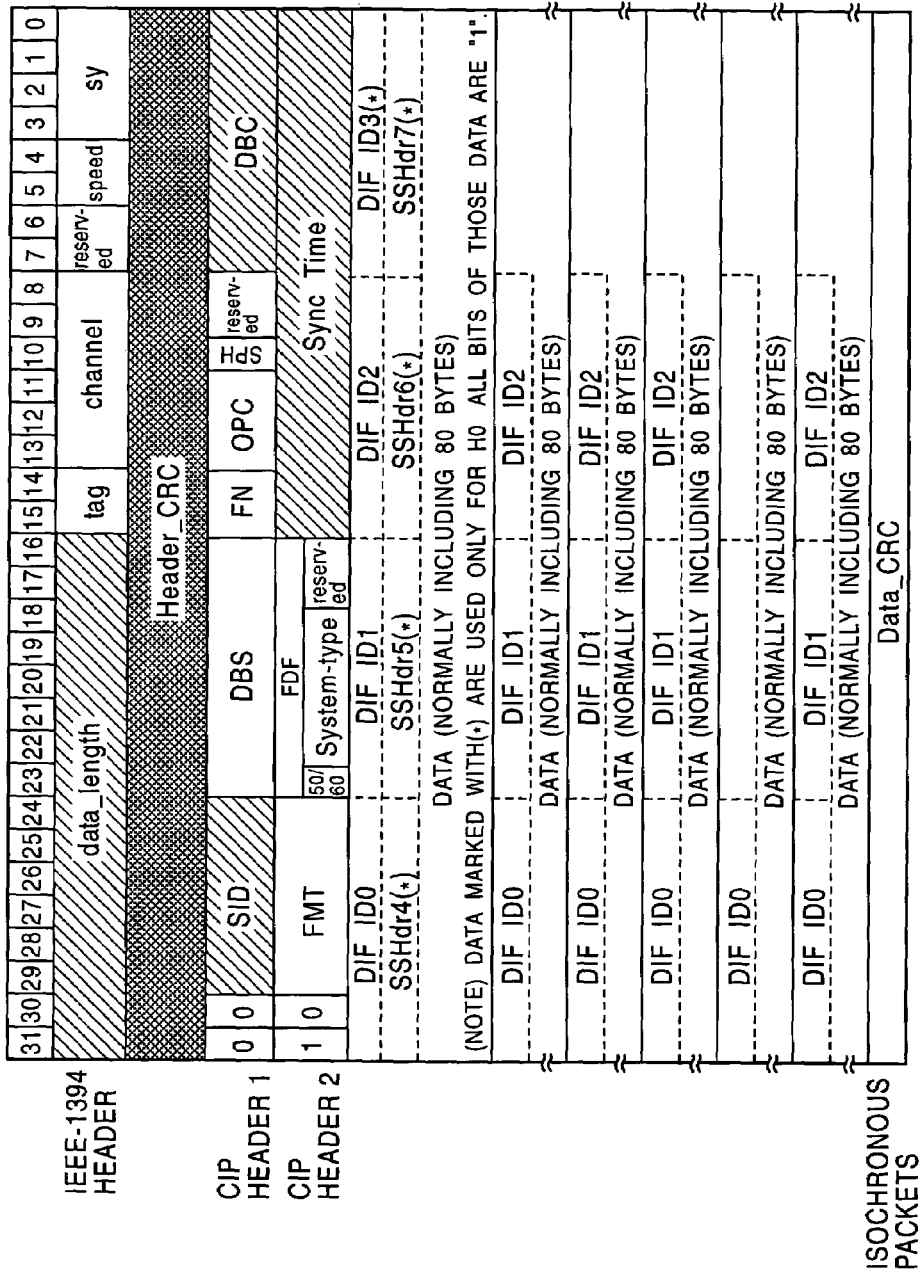
FIG. 4 is a schematic diagram illustrating a structure of an isochronous packet.
Figure 5:
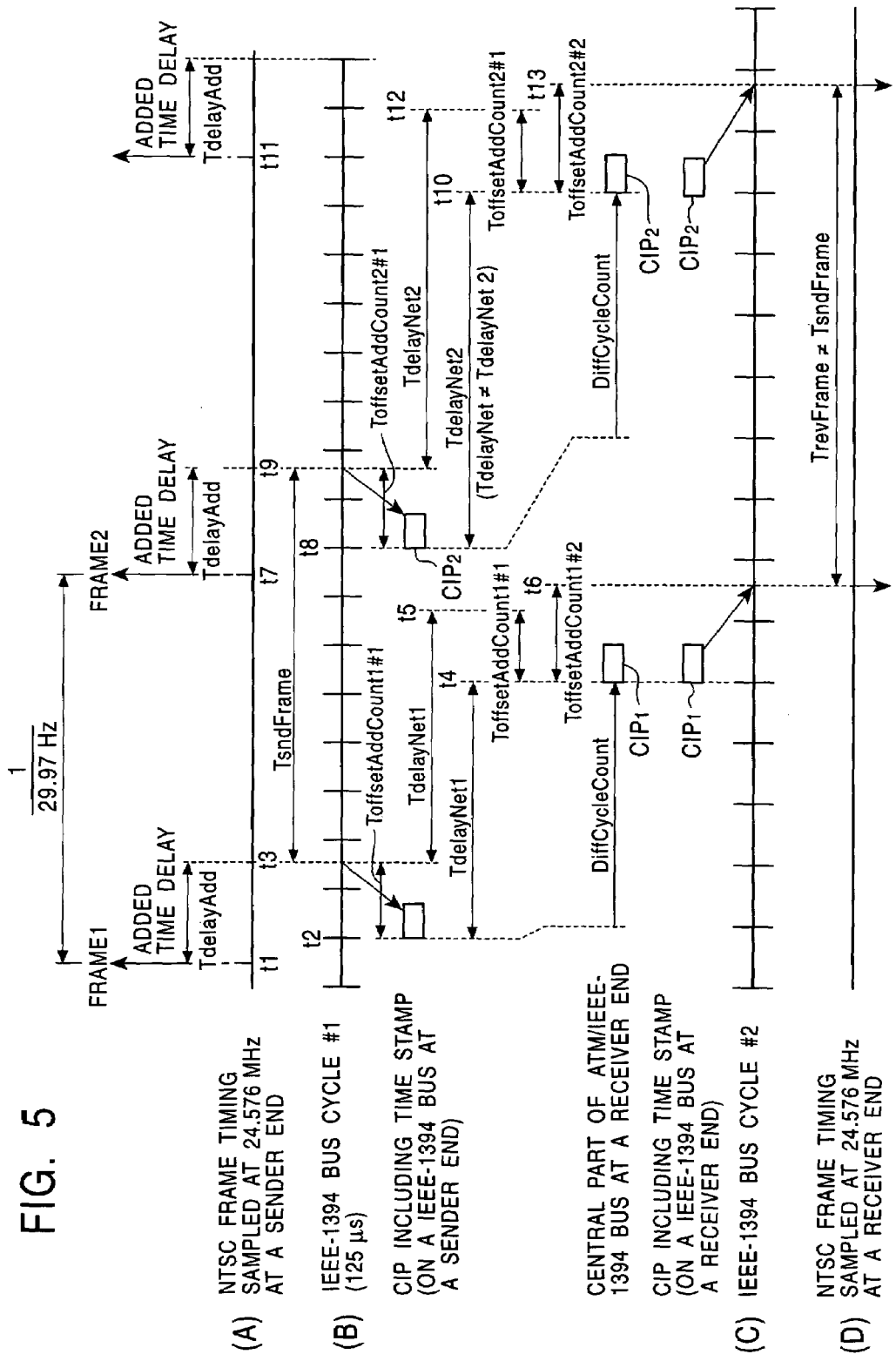
FIG. 5 is a timing chart illustrating the operation of the network system shown in FIG. 1.
Figure 6:
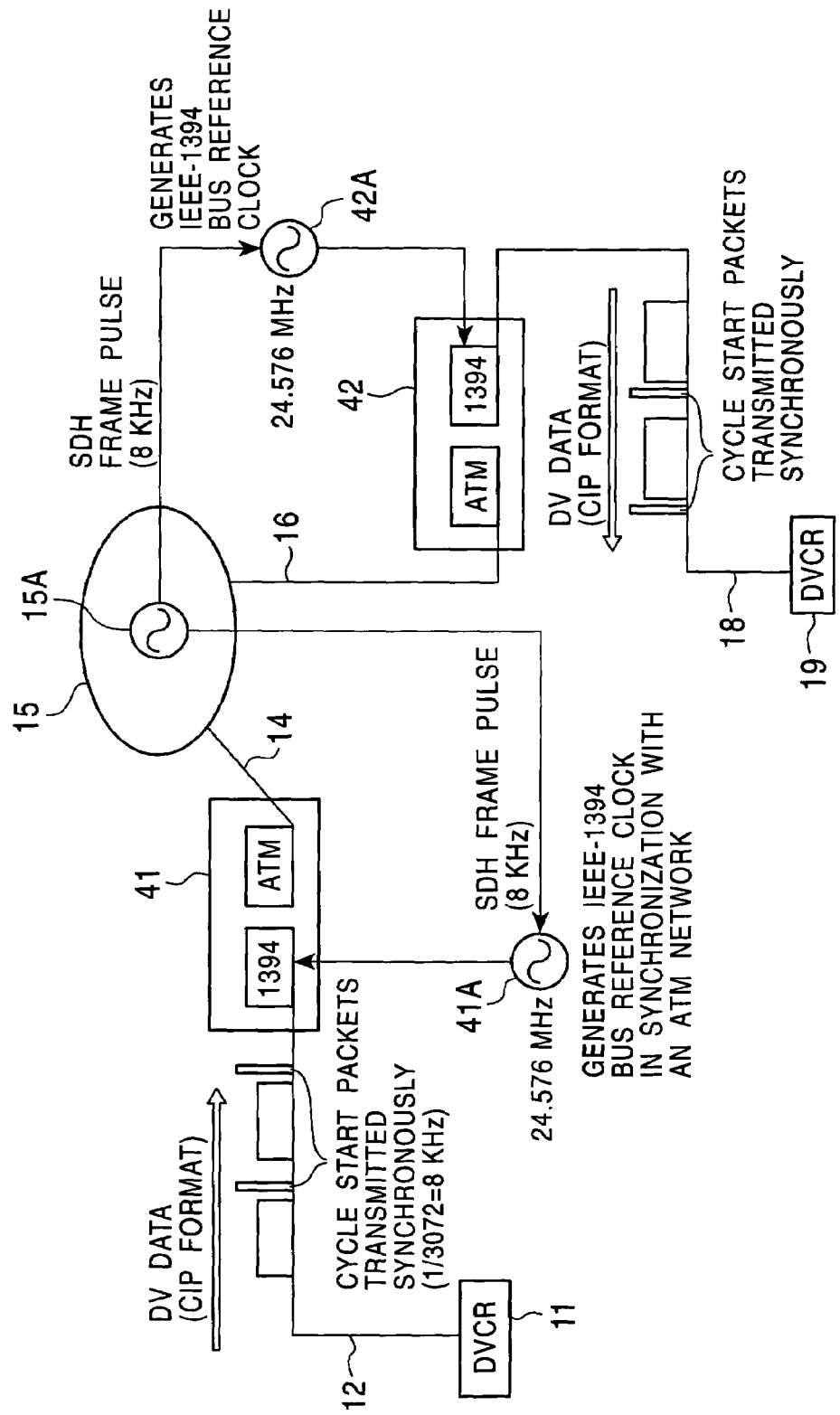
FIG. 6 is a schematic diagram illustrating the configuration of a network system which has been previously proposed.

In step S2, the low-order 16-bit value of the cycle time register at the present time (time t1) is added with a delay time TdelayAddCount, and the result is placed in a sync time field in a CIP header of a CIP packet including a frame synchronization signal of a first frame (FIG. 4). Thereafter, in step S3, the DVCR 11-1 transmits, in a bus cycle starting at a time t2, the above-described CIP packet as an isochronous packet to the IEEE-1394 serial bus 12-1.

As in the conventional system, the time stamp included in the CIP packet has a value corresponding to a time t3 that is later than the time t1 by the added delay time TdelayAddCount.

The data output from the DVCR 11-1 is transmitted to the ATM/IEEE-1394 data transfer apparatus 41-1 via the IEEE-1394 serial bus 12-1. In the ATM/IEEE-1394 data transfer apparatus 41-1, the above data is input to the IEEE-1394 3-port PHY block 54 via for example the port 51 (the ATM/IEEE-1394 data transfer apparatus 41-1 has a similar structure to the ATM/IEEE-1394 data transfer apparatus 41-2 shown in FIG. 8), and an interfacing process is performed upon the data. The interfacing process is performed in accordance with the bus reference clock signal which is generated by the clock synchronization circuit 59 in synchronization with the ATM reference clock signal, and thus this process is synchronous in phase with the operation of the ATM network 15-1. The IEEE-1394 link layer block 55 processes the data received from the IEEE-1394 3-port PHY block 54, in response to the timing of transmitting a cycle start packet generated synchronously with the ATM reference clock signal supplied from the ATM PHY block 57. The resultant data is output to the PCI bus 65. The system controller 61 receives this data via the PCI bus 65 and transfers it to the memory block 62 via the local bus 64. The memory block 62 stores the received data.

The CPU 60 read the data stored in the memory block 62 via the system controller 61 and the supplies the data to the ATM SAR block 58. The ATM SAR block 58 divides the data transmitted from the memory block 62 into ATM cells and supplies the resultant ATM cells to the ATM PHY block 57. The ATM PHY block 57 converts the ATM cells received from the ATM SAR block 58 into data which satisfies the specifications of the optical block 56. The resultant data is output to the optical block 56. The optical block 56 outputs the received data to the ATM network 15-1 via the UNI 14-1.

The ATM network 15-1 supplies the ATM cells received from the ATM/IEEE-1394 data transfer apparatus 41-1 via the UNI 14-1 to the ATM network 15-2 via the NNI 101. The ATM network 15-2 supplies the ATM cells received via the NNI 101 to the ATM/IEEE-1394 data transfer apparatus 42-2 via the UNI 16-2.

Now, the operation of the ATM/IEEE-1394 data transfer apparatus 42-2 is described below with reference to the flow chart shown in FIG. 11. In step S51, the CPU 60 starts the operation shown in this flow chart, in response to a scheduling timer interrupt generated every 4 ms by the scheduling timer 63.

The intervals at which interrupts occur are described below with reference to FIG. 12. In the present embodiment, when the time stamp is rewritten, the rewriting is performed such that the time stamp gradually varies over a period with a length of Def_SyncPeriod (24 frames, for example) previously specified by a user as a default value, as will be described in further detail later. One frame of DV data is transmitted in 250 cycles of the IEEE-1394 serial bus, wherein one cycle has a length of 125 μs. The process shown in the flow chart of FIG. 11 is performed every 4 ms, that is, every 32 cycles.

In step S52, the CPU 60 converts ATM cells supplied from the ATM network 15-2 into packets and stores them in intermediate buffers such that different data flows are stored in different buffers.

More specifically, the optical block 56 converts ATM cells in the form of an optical signal supplied from the ATM network 15-2 into an electrical signal and supplies the resultant electrical signal to the ATM PHY block 57. The ATM PHY block 57 extracts ATM cells to be transferred to the ATM SAR block 59 from the data received from the optical block 56. The extracted ATM cells are supplied to the ATM SAR block 58. The ATM SAR block 58 assembles the ATM cells received from the ATM PHY block 57 and supplies the resultant data to the memory block 62 via the system controller 51 and the PCI bus 65. The memory block 62 stores the received data.

Figure 13:
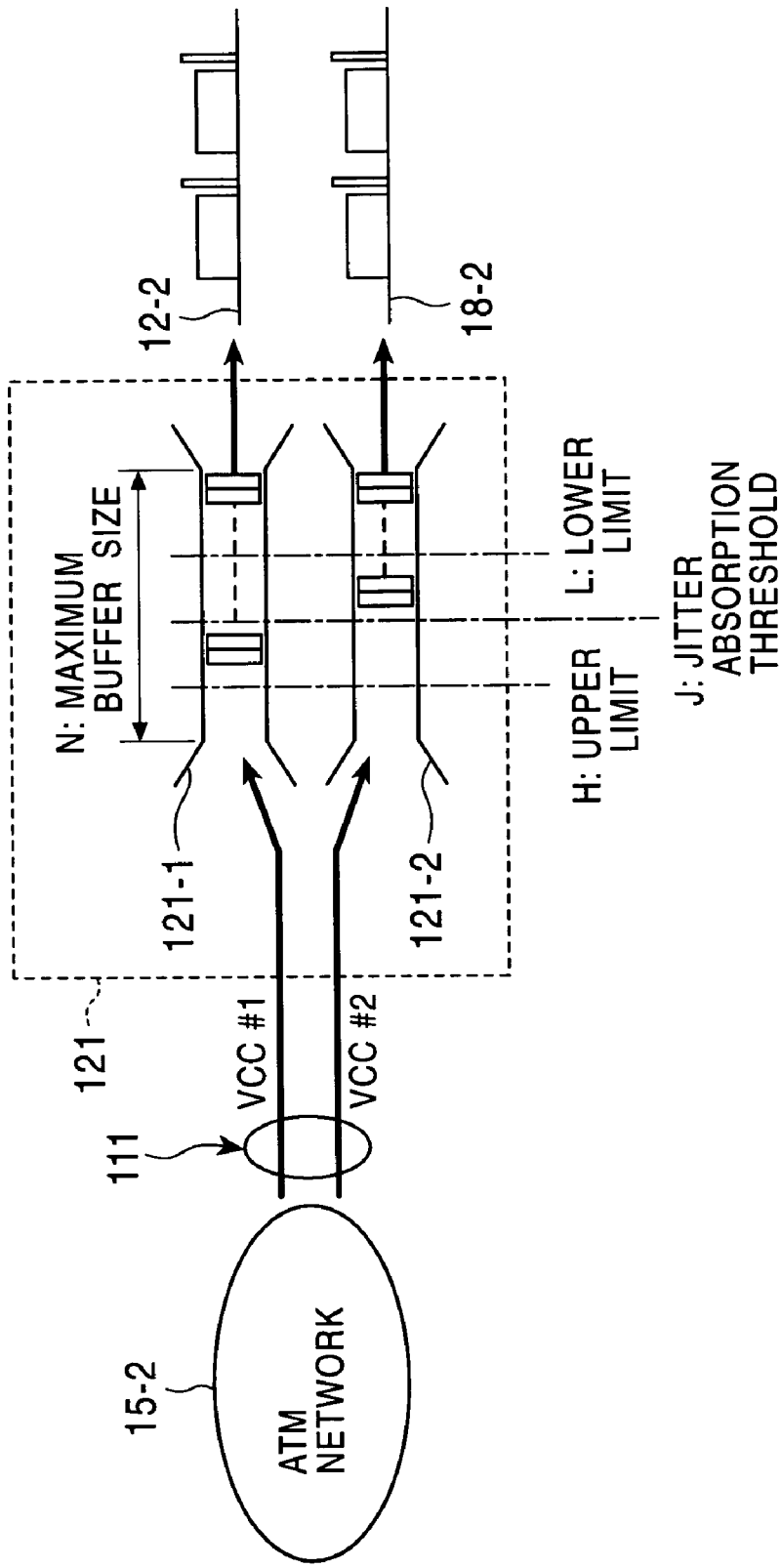
FIG. 13 is a schematic diagram illustrating an example of a configuration of an intermediate buffer of the ATM/IEEE-1394 data transfer apparatus 42-2 shown in FIG. 7.

In the memory block 62, intermediate buffers are formed for the respective data flows as shown in FIG. 13. In the example shown in FIG. 13, intermediate buffers are formed for the respective data flows supplied via VCCs (Virtual Channel Connections) from the ATM network 15-2, wherein the VCCs are realized in ATM fibers 111 forming the UNI 6-2. In the example shown in FIG. 13, there are two VCCs, that is, VCC #1 and VCC #2, and two intermediate buffers 121-1 and 121-2 are formed for a data flow #1 and data flow #2 corresponding to the VCC #1 and the VCC #2. For example, the VCC #1 corresponds to a VCC formed between the IEEE-1394 serial bus 18-1 and the IEEE-1394 serial bus 12-2, and the VCC #2 corresponds to a VCC formed between the IEEE-1394 serial bus 12-1 and the IEEE-1394 serial bus 18-2. In this specific example, the data received from the IEEE-1394 serial bus 18-1 is supplied to the intermediate buffer 121-1 for the flow #1 and stored therein, and the data received from the IEEE-1394 serial bus 12-1 is supplied to the intermediate buffer 121-2 for the flow #2 and stored therein. Although it is assumed herein, for simplicity, that one data stream is transmitted via each IEEE-1394 serial bus, a plurality of data streams may be transmitted. In this case, as many intermediate buffers and VCCs are formed as there are data streams.

In step S53, the CPU 60 sets a variable n representing the flow number to an initial value equal to 1. Thereafter, in step S54, the CPU 60 determines whether the amount of data stored in an intermediate buffer for the flow #n (n=1 or 2 in the specific example shown in FIG. 13) is smaller than the jitter absorption threshold, at the start of the data flow (immediately after starting the process upon the data flow).

As shown in FIG. 13, the intermediate buffers 121-1 and 121-2 for the respective flows have a maximum buffer size of N (corresponding to, for example, 256 CIPS). Furthermore, for each intermediate buffer, an upper limit H (corresponding to, for example, 96 CIPS), a lower limit L (corresponding to, for example, 32 CIPs), and a jitter absorption threshold J (corresponding to, for example, 64 CIPS) are set. Herein, the upper limit H is greater than the lower limit L, and the jitter absorption threshold J is set to a value between the lower limit L and the upper limit H.

In the case where it is determined that the data flow has just been started and that the amount of data stored in the intermediate buffer 121-1 for the flow #n (n=1 in this example) is smaller than the jitter absorption threshold, the process jumps to step S63. In step S63, it is determined whether reading data is completed for all intermediate buffers (two intermediate buffers 121-1 and 121-2 in the example shown in FIG. 13). At the present time, the reading of data is not completed, and thus the process goes to step S64. In step S64, the value of the variable n is incremented by 1. That is, n becomes equal to 2, in this specific case.

Thereafter, the process returns to step S54 to again determine whether a data flow has just been started and whether the amount of data stored in the intermediate buffer 121-2 for the flow #2 is smaller than the jitter absorption threshold J. If it is determined that a data flow has just been started and that the amount of data stored in the intermediate buffer 121-2 for the flow #2 is smaller than the jitter absorption threshold J, the process jumps to step S63. In step S63, it is determined whether reading data is completed for all intermediate buffers. In this specific case, the reading of data is not completed, and thus the process again returns to step S64 and the value of the variable n is incremented by 1. If the value of the variable n reaches the maximum value, the value of the variable n is reset to the initial value (1 in the present example) in the next incrementing operation. In the present example, the value of n is 2 which is equal to the maximum value, and thus the value of n is reset to 1. Thereafter, the process returns to step S54, and the above process is performed repeatedly.

As described above, transmission of data to the IEEE-1394 serial bus is performed after the amount of data stored in the intermediate buffer 121-1 for the flow #1 or the intermediate buffer 121-2 for the flow #2 has become equal to or greater than the jitter absorption threshold. This makes it possible to effectively absorb jitter which occurs on the networks. However, if the jitter absorption threshold J is too large, a large time delay results. Conversely, if the jitter absorption threshold J is too small, jitter which can be absorbed is limited to a small range.

During the iteration of the above process, the amounts of data stored in the intermediate buffer 121-1 for the flow #1 and the intermediate buffer 121-2 for the flow #2 become equal to or greater than the jitter absorption threshold J. At this stage, it is determined in step S54 that the amounts of data stored in the buffers are not smaller than the jitter absorption threshold J, and thus process goes to step S55. In step S55, the CPU 60 reads a data packet (CIP) from the intermediate buffer 121-1 for the flow #1 (n=1, in this case). Thereafter, in step S56, it is determined whether the CIP is a CIP at the beginning of a frame. In the case where the CIP is determined as being a CIP at the beginning of a frame, the process goes to step S57 and a time stamp is rewritten. The operation of rewriting the time stamp will be described in detail later with reference to FIG. 14. The time stamp described in the CIP header has a valid value only in a CIP at the beginning of a frame. Thus, when it is determined in step S56 that the present CIP is one at the beginning of a frame, the time stamp of that CIP is rewritten in step S57. On the other hand, if the present CIP is not a CIP at the beginning of a frame, the time stamp has an invalid value and thus it is not necessary to rewrite the time stamp. In this case, therefore, step S57 is skipped.

In step S58, the CPU 60 determines whether reading of CIPs for a period of 4 ms (corresponding to 32 cycles) is completed. As described earlier with reference to FIG. 12, the operation shown in the flow chart of FIG. 11 is performed periodically every 4 ms. This means that data accumulated for 4 ms (corresponding to 32 cycles) is stored in the intermediate buffer 121-1 for the flow #1. If it is determined in step S58 that the reading of CIPs for a period of 4 ms is not completed, the process returns to step S55, and step S55 and following steps are repeated.

If it is determined in step S58 that the reading of CIPs for a period of 4 m is completed, the process goes to step S59. In step S59, the CPU 60 calculates the amount of data stored in the intermediate buffer 121-1 for the flow #1. Thereafter, in step S60, it is determined whether the amount of data calculated in step S59 is equal to or greater than the upper limit H, equal to or smaller than the lower limit L, or in the range between the lower limit L and the upper limit H. In the case where it is determined in step S60 that the amount of data stored in the buffer is equal to or greater than the upper limit, there is a possibility that an overflow will occur in the intermediate buffer for that flow. In this case, to avoid the above problem the process goes to step S61, and an overflow preventing routine is executed. The overflow preventing routine will be described in detail later with reference to a flow chart shown in FIG. 16. In the case where it is determined in step S60 that the amount of data stored in the buffer is equal to or smaller than the lower limit, there is a possibility that an underflow will occur. In this case, to avoid the above problem, the process goes to step S62, and an underflow preventing routine is executed. The underflow preventing routine will be described in detail later with reference to a flow chart shown in FIG. 17.

When the overflow preventing routine in step S61 or the underflow preventing routine in step S62 is completed, or when it is determined in step S60 that the amount of data in the buffer is in the range between the lower limit L and the upper limit H, the process goes to step S63. In step S63, it is determined whether the reading of data is completed for all intermediate buffers. In this specific case, n=1, and thus there is an intermediate buffer whose data has not been read. Thus, the process goes to step S64, and the value of the variable n is incremented by 1 so that n becomes equal to 2. Thereafter, the process returns to step S54 to perform a similar process for the flow #2.

In the case where it is determined in step S63 that the reading of data is completed for all intermediate buffers, the process goes to step S65, and the CPU60 are transmitted to the IEEE-1394 serial bus.

That is, the CPU 60 supplies the CIPs, which have been read in step S55, to the IEEE-1394 link layer block 55 via the system controller 61 and the PCI bus 65. The IEEE-1394 link layer block 55 converts the received data in the ATM format into the format predefined for use by the IEEE-1394 serial bus using the CPU 60. The resultant data is output to the IEEE-1394 3-port PHY block 54. The IEEE-1394 3-port PHY block 54 converts the data received from the IEEE-1394 link layer block 55 into signals in a form according to the IEEE-1394 serial bus standard and outputs the resultant signals to the respective IEEE-1394 serial buses 12-2 and 18-2 via, for example, the ports 51 and 52. The isochronous packets transmitted to the IEEE-1394 serial bus 18-2 is supplied to the DVCR 19-2.

Figure 11:
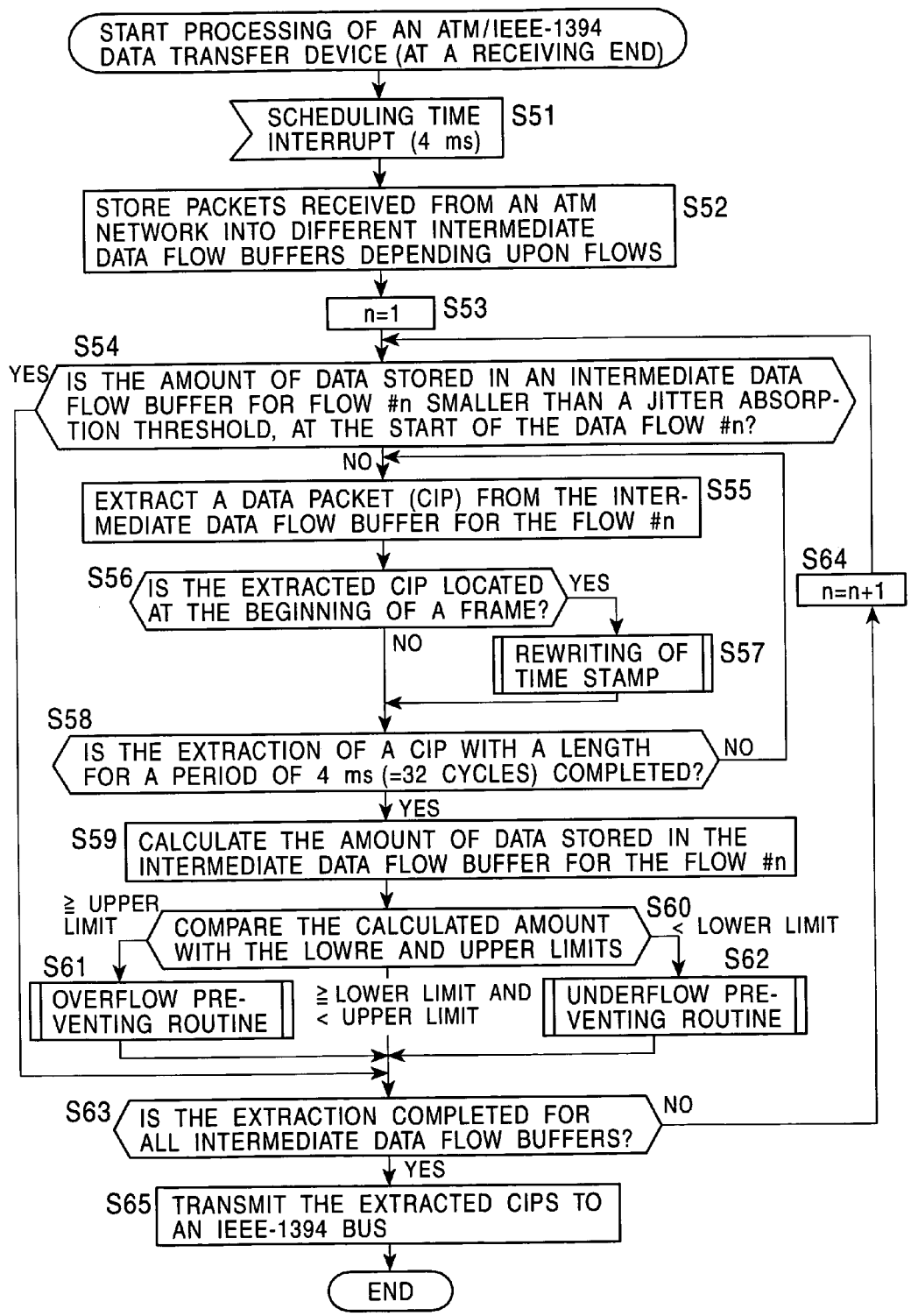
FIG. 11 is a flow chart illustrating the operation of the ATM/IEEE-1394 data transfer apparatus 42-2 shown in FIG. 7.
Figure 12:
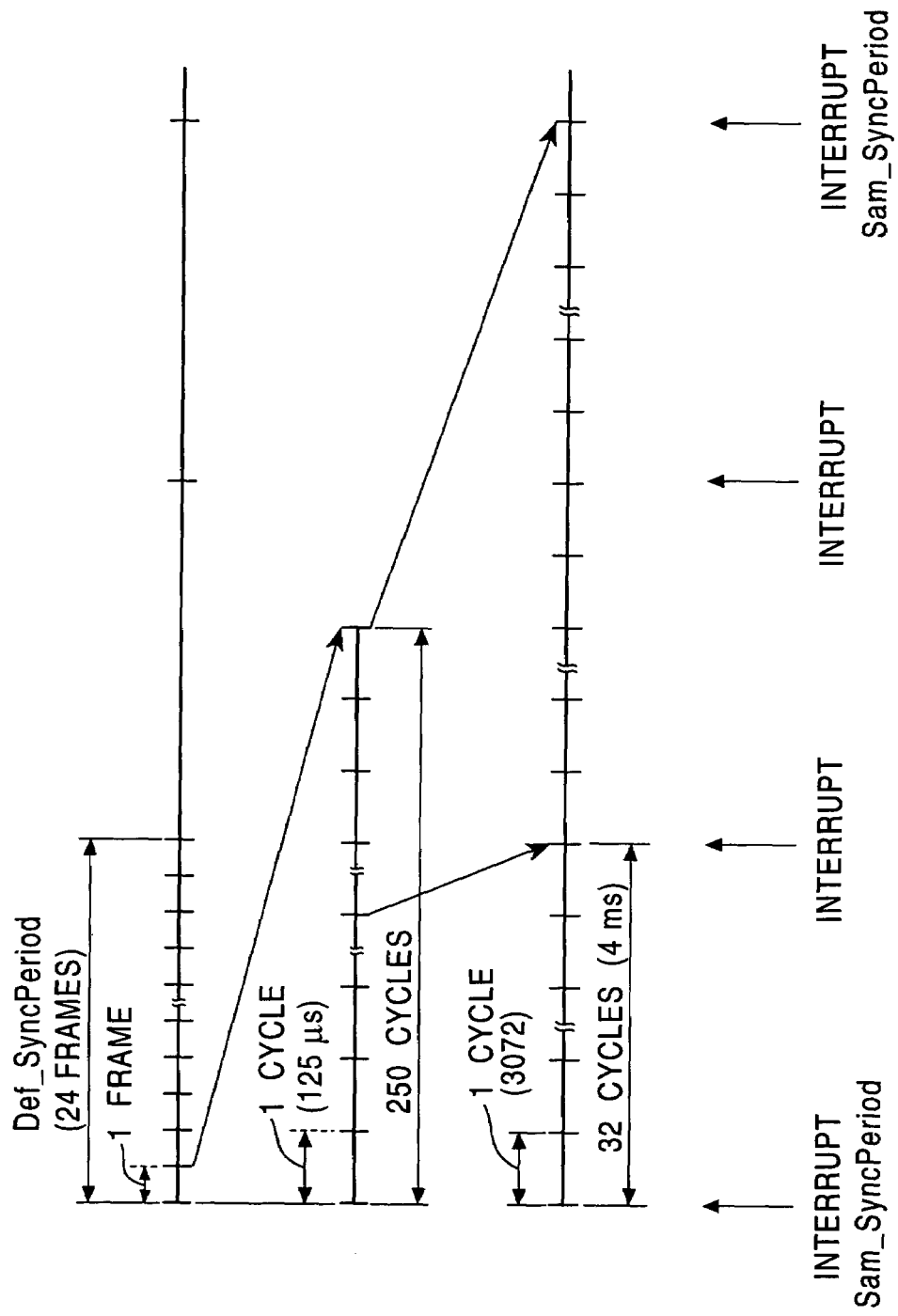
FIG. 12 is a timing chart illustrating the timing associated with the process shown in FIG. 11.

The operation of rewriting a time stamp in step S57 shown in FIG. 11 is described in further detail below with reference to a flow chart shown in FIG. 14.

First, in step S81, the CPU 60 extracts a time stamp described in SyncTime of a CIP (FIG. 4). In step S82, the CPU 60 determines whether DiffCycleCount has been calculated. DiffCycleCount is a variable reflecting the difference between the value of the cycle time register of the cycle master of an IEEE-1394 serial bus (IEEE-1394 serial bus 12-1 in this specific example) to which a transmitting device is connected and that of the cycle master of an IEEE-1394 serial bus (IEEE-1394 serial bus 18-2 in this specific example) to which a receiving device is connected. As with the time stamp, DiffCycleCount is represented in 16 bits wherein high-order 4 bits are used to indicate the value of the cycle count and the low-order 12 bits are used to indicate the value of the cycle offset.

In the case where DiffCycleCount has not been calculated, the process goes to step S83. In step S83, the CPU 60 calculates the difference between the value of the cycle count (high-order 4 bits) of the extracted time stamp and the value of the cycle count of the cycle time register at the time when the CIP was actually transmitted to the IEEE-1394 serial bus. In step S84, the CPU 60 adds the value of the cycle count of TdelayAdd to the difference calculated in step S83 thereby obtaining DiffCycleCount. Thereafter, the process goes to step S95.

In the case where it is determined in step S82 that the value of DiffCycleCount has been calculated, the process goes to step S85. In step S85, the CPU 60 determines whether a flag F_UnderFlowOccur indicating an occurrence of an underflow is set to "ON". This flag is set to "ON" in step S140 which will be described later with reference to FIG. 17, when the amount of data stored in a buffer is smaller than the lower limit L. In the case where it is determined in step S85 that the flag F_UnderFlowOccur is in the "ON" state, the process goes to step S86. In step S86, the CPU 60 adds 3072/Def_SyncPeriod to Sam_SyncPeriod.

When the time stamp is rewritten gradually over a plurality of frames, Def_SyncPeriod is used to specify the number of frames (24 frames, for example) over which the time stamp is rewritten, and a default value of Def_SyncPeriod is predetermined by a user. Sam_SyncPeriod is a variable representing the value of the low-order 12 bits of the time stamp which is varied over frames the number of which is specified by Def_SyncPeriod. Values up to 4,096 can be represented using 12 bits wherein a value of 3072 corresponds to one cycle (1 in the least significant bit of the high-order 4 bits of the time stamp). Therefore, in order to gradually vary the value of the time stamp over frames the number of which is specified by Def_SyncPeriod, the time stamp should be varied from one frame to another by a value obtained by dividing 3072 corresponding to one cycle by Def_SyncPeriod (the number of frames). In other words, the value of Sam_SyncPeriod is incremented by 3072/Def_SyncPeriod from one frame to next over a period of Def_SyncPeriod. That is, the value of Sam_Syncperiod increases one from to next, such as Sam_SyncPeriod1, Sam_SyncPeriod2, and so on. Therefore, Sam_SyncPeriod indicates the position (phase) in each period of Def_SyncPeriod.

Figure 17:
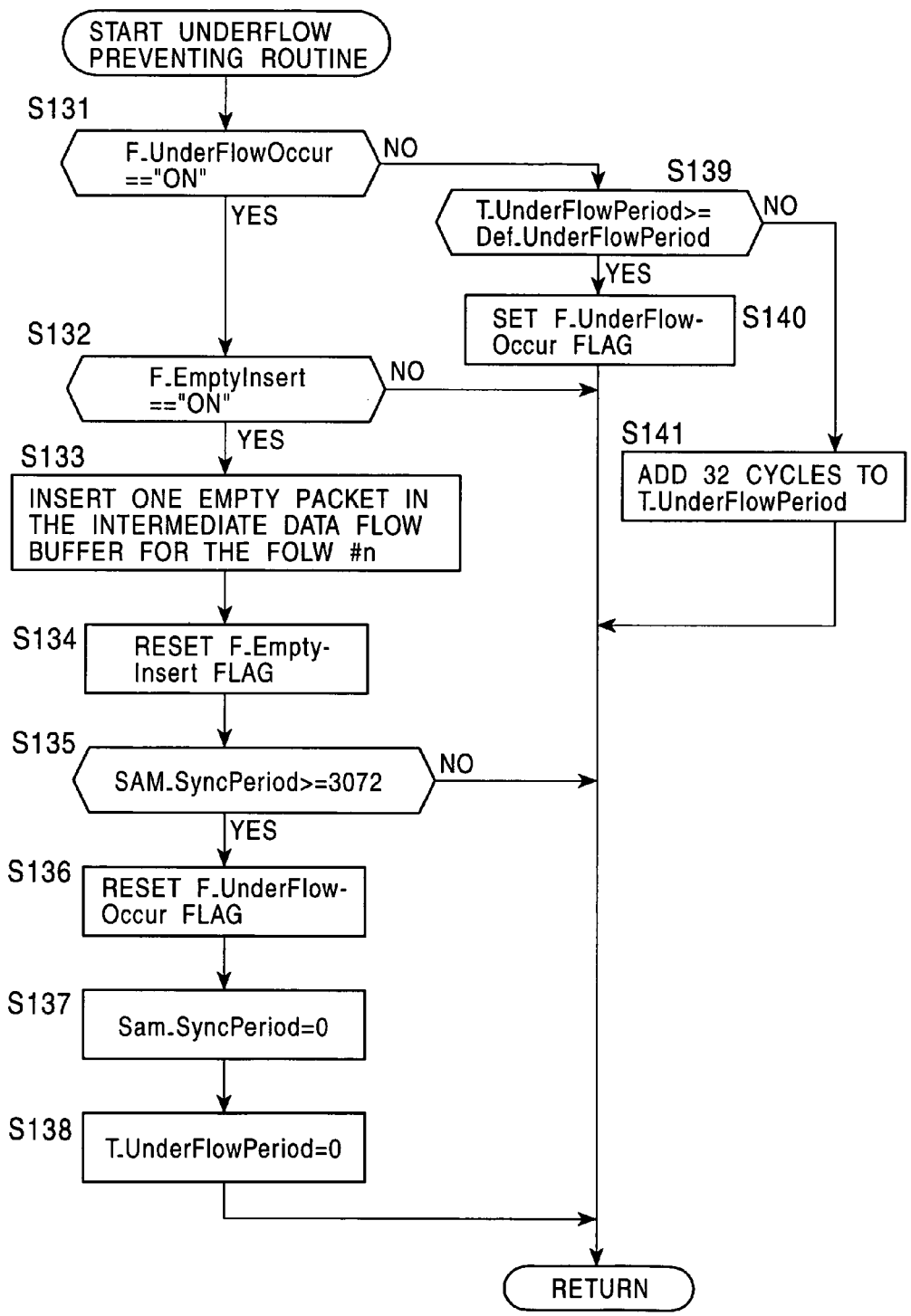
FIG. 17 a flow chart illustrating the details of an underflow preventing process in step S62 shown in FIG. 11.

In step S87, the CPU 60 determines whether the value of Sam_SyncPeriod has become equal to 3072/2. That is, it is determined whether the position (phase) of the current frame being processed has reached the exact middle (the 12th frame) of the period (24 frames) specified by Def_SyncPeriod. In the case where it is determined that the value of Sam_SyncPeriod is equal to 3072/2, the process goes to step S88. In step S88, the CPU 60 turns on a flag F_EmptyInsert. When the flag F_EmptyInsert is in the ON state, one empty packet is inserted into the intermediate buffer for the flow #n, in step S133 as will be described in detail later with reference to FIG. 17. In the case where it is determined in step S87 that the value of Sam_SyncPeriod is not equal to 3072/2, step S88 is skipped. That is, in this case, the flag F_EmptyInsert is not turned on, and thus insertion of an empty packet in step S133 shown in FIG. 17 is not executed.

That is, when there is a possibility that an under flow will occur, one empty packet is inserted at the exact middle (corresponding to 3072/2) of a period including frames the number of which is represented by Def_SyncPeriod specified by a user. This prevents two or more empty packet from being inserted within a period specified by Def_SyncPeriod.

Thereafter, the process goes to step S89 in which the CPU 60 adds Sam_SyncPeriod to DiffCycleCount. That is, in response to the incrementing of the value Sam_SyncPeriod by an amount corresponding to one frame in step S86, the value thereof is added to DiffCycleCount and the updated value of DiffCycleCount is added to the original time stamp of the CIP so that the time stamp at the beginning of the frame is rewritten. Although insertion of an empty packet is performed only once at the exact middle of Def_SyncPeriod, the time stamp is gradually rewritten frame by frame over the entire period of Def_SyncPeriod.

In this method in which insertion of an empty packet is performed only once in a period specified by Def_SyncPeriod, the change in the value of the time stamp which is rewritten in response to the insertion of the empty packet becomes smaller than in the case where insertion of one or more empty packets is allowed. Furthermore, gradual rewriting of the time stamp frame by frame over the entire period of Def_SyncPeriod results in dispersion of the change in the time stamp, caused by the insertion of one empty packet, over the entire period of Def_SyncPeriod, and thus a further reduction is achieved in the change in the time stamp for each insertion. Besides, because an empty packet is inserted at the substantially middle position (corresponding to 3072/2) of a period of Def_SyncPeriod (time stamp rewriting period), it becomes possible for a device connected to an IEEE-1394 serial bus to reproduce a reference clock in a more stable and reliable fashion.

On the other hand, in the case where it is determined in step S85 that the flag F_UnderFlowOccur is not in the ON state, the process goes to step S90 to further determine whether a flag F_OverFlowOccur is in an ON state. As will be described later, the flag F_OverFlowOccur is turned on in step S120 in FIG. 16, when the amount of data stored in a buffer is greater than the upper limit H.

If it is determined that the flag F_OverFlowOccur is in the ON state, the process goes to step S91. In step S91, the CPU 60 adds 3072/Def_SyncPeriod to Sam_SyncPeriod. Thereafter, in step S92, the CPU 60 determines whether the value of Sam_SyncPeriod updated in step S91 is equal to 3072/2. Steps S91 and S92 are similar to steps S86 and S87 described earlier.

If it is determined, in step S92, that the value of Sam_SyncPeriod is equal to 3072/2, the process goes to step S93. In step S93, the CPU 60 turns on a flag F_EmptyDiscard. When the flag F_EmptyDiscard is in the ON state, one empty packet is discarded in step S113 shown in FIG. 16 as will be described in further detail later. In the case where it is determined, in step S92, that the value of Sam_SyncPeriod is not equal to 3072/2, step S93 is skipped.

Thereafter, in step S94, the CPU 60 subtracts the value of Sam_SyncPeriod updated in step S91 from DiffcycleCount so that DiffCycleCount has a value corresponding to the value of Sam_SyncPeriod updated in step S91. Thereafter, in step S95, the value of DiffCycleCount is added to the original time stamp, and the resultant value is placed as a time stamp in the sync time field of the CIP.

That is, when there is a possibility that an overflow will occur, an empty packet is discarded, wherein discarding is performed only once in a period defined by Def_SyncPeriod, at the middle thereof as in the insertion of an empty packet. However, rewriting of the time stamp, which is necessary when an empty packet is discarded, is performed gradually from one frame to next over the entire period of Def_SyncPeriod.

After completion of step S84, or in the case where it is determined in step S90 that the flag F_OverFlowOccur is not in the ON state, the process goes to step S95.

In step S95, the CPU 60 adds the value of DiffCycleCount which was calculated in step S84 or had been previously calculated to the value of the time stamp extracted in step S81. The resultant value is placed in the sync time field of the CIP read in step S55 in FIG. 11. Thereafter, the process goes to step S58 in FIG. 11.

Figure 16:
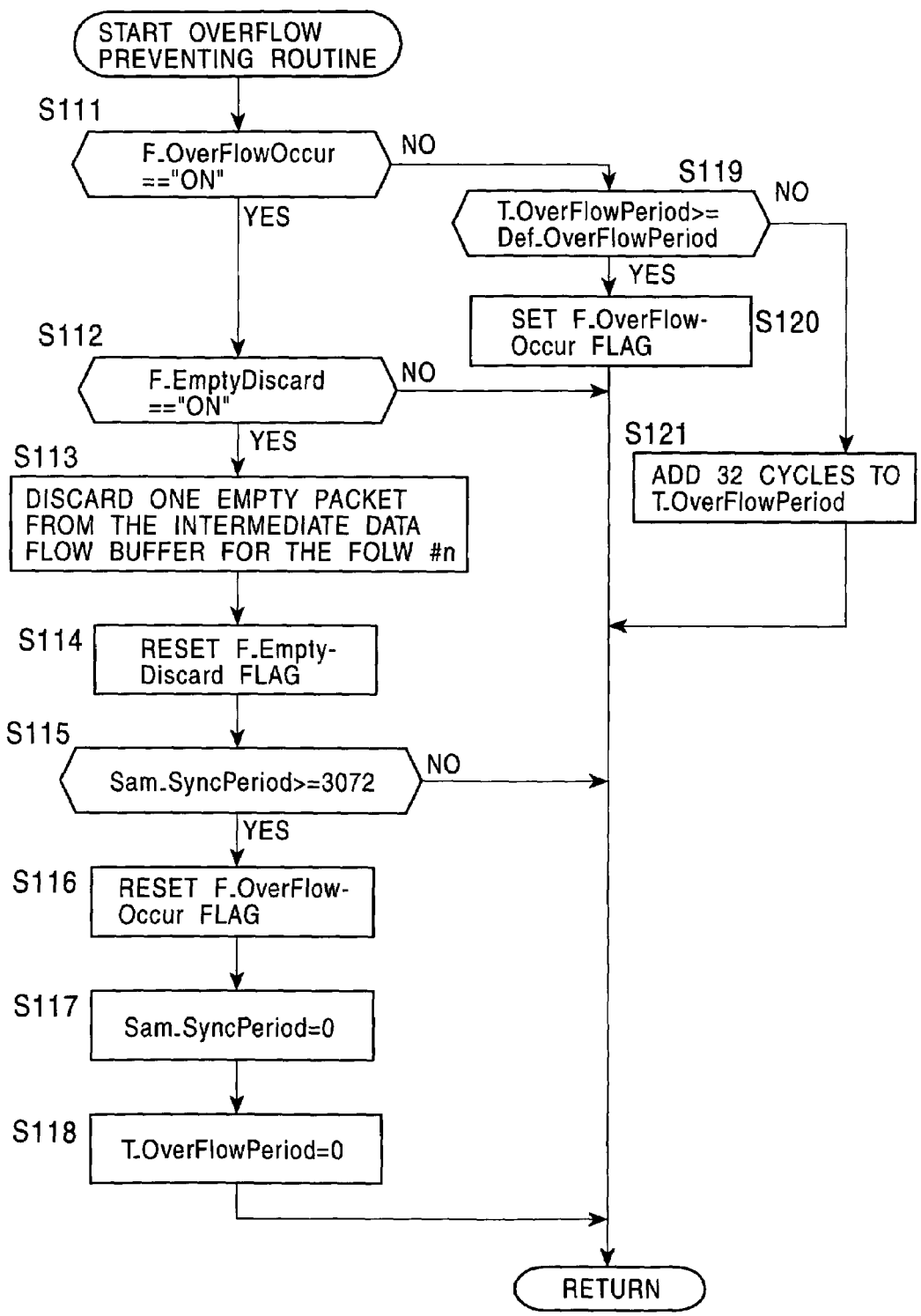
FIG. 16 is a flow chart illustrating the details of an overflow preventing process in step S61 shown in FIG. 11.

The overflow preventing routine in step S61 shown in FIG. 11 is described in further detail below with reference to a flow chart shown in FIG. 16. As described earlier with reference to FIG. 11, this routine is executed when it is determined in step S60 that the amount of data stored in a buffer is greater than the upper limit H.

In step S11, the CPU 60 determines whether the F_OverFlowOccur is in the ON state. If the F_OverFlowOccur is not in the ON state, the process goes to step S119 in which it is determined whether T_OverFlowPeriod is equal to or greater than Def_OverFlowPeriod. T_OverFlowPeriod represents the length of time in units of 4 ms (32 cycles) which has elapsed since F_OverFlowOccur was turned on, and Def_OverFlowPeriod has a default value in units of 4 ms (32 cycles) which is previously set by a user. In contrast to Def_SyncPeriod and Sam_SyncPeriod which are represented in units of frames of a video signal according to the NTSC or PAL standard, T_OverFlowPeriod and Def_OverFlowPeriod are represented in units of cycles. This allows the timing of discarding an empty packet to be controlled more precisely and also allows the interval at which empty packets are discarded to be specified over a wider range than is allowed in the case where the interval is specified only by Def_SyncPeriod and Sam_SyncPeriod.

In the case where it is determined in step S119 that T_OverFlowPeriod is smaller than Def_OverFlowPeriod, the process goes to step S121. In step S121, the CPU 60 adds 32 cycles to T_OverFlowPeriod. As a result, T_OverFlowPeriod is set to indicate the length of a period which has elapsed since the time at which the amount of data in a buffer reached the upper limit H.

If the above process is repeated in units of 32 cycles, the value of T_OverFlowPeriod gradually increases and the value can finally become equal to or greater than Def_OverFlowPeriod. In this case, the process goes from step S119 to S120 in which the CPU 60 turns on the flag F_OverFlowOccur. That is, this flag indicates that the period, which has elapsed since the time at which the amount of data in the buffer reached the upper limit H, has become greater than Def_OverFlowPeriod specified by the user.

If the flag F_OverFlowOccur has been turned on via the above process, when step S111 is executed after a further lapse of 32 cycles, it is determined that the flag F_OverFlowOccur is in the ON state, and thus the process goes to step S112. In step S112, it is determined whether the flag F_EmptyDiscard is in the ON state. As described above, this flag is turned on in step S93 shown in FIG. 14. That is, if the value of Sam_SyncPeriod has not reached 3072/2, the flag F_EmptyDiscard has not been turned on yet. In this case, no further processing is performed in the overflow preventing routine.

In the case where it is determined in step S112 that the flag F_EmptyDiscard is in the ON state, the process goes to step S113 and the CPU 60 discards one empty packet from the intermediate buffer for the flow #n. Because an empty packet has been discarded, the CPU 60 turns off the flag F_EmptyDiscard in step S114.

Thereafter, in step S115, the CPU 60 determines whether the value of Sam_SyncPeriod has become equal to or greater than 3072. If the value of Sam_SyncPeriod is smaller than 3072, no further processing is performed in the overflow preventing routine.

Figure 14:
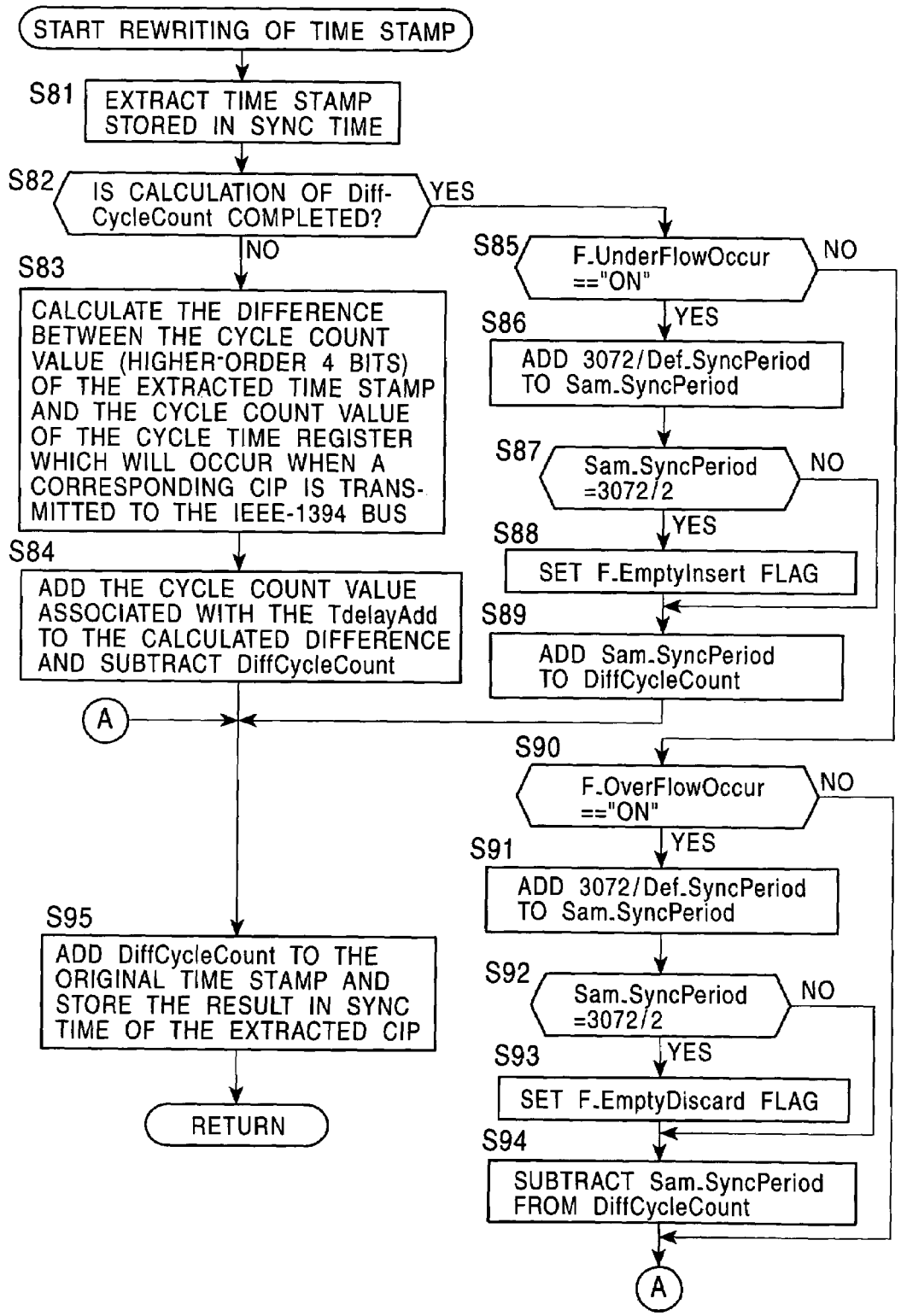
FIG. 14 is a flow chart illustrating the details of the process of rewriting a time stamp performed in step S57 shown in FIG. 11.
Figure 15:
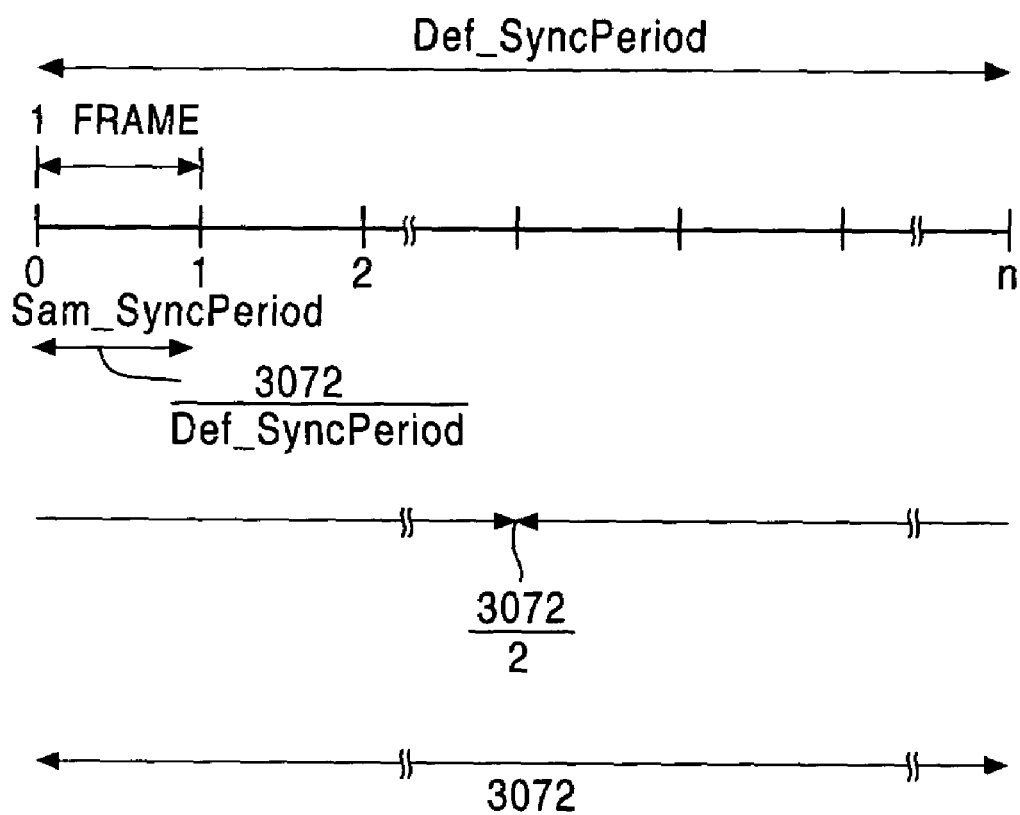
FIG. 15 is a flow chart illustrating the process performed in step S87 shown in FIG. 14.

When the flag F_OverFlowOccur is in the ON state, the value of Sam_SyncPeriod is increased from one frame to next by steps S90 and S91 shown in FIG. 14. When the number of frames has reached the value specified by Def_SyncPeriod, the value of Sam_SyncPeriod becomes equal to 3072. If processing upon a further frame is started, the value of Sam_SyncPeriod becomes greater than 3072. In this case, the process goes from step S115 to S116 and the CPU 60 turns off the flag F_OverFlowOccur. Furthermore, in steps S117 and S118, the values of Sam_SyncPeriod and T_OverFlowPeriod are reset to 0.

Thereafter, the process returns to step S63 shown in FIG. 11.

Now, the underflow preventing routine in step S62 shown in FIG. 11 is described in further detail below with reference to a flow chart shown in FIG. 17. This routine is started when it is determined that the amount of data in a buffer has become equal to or smaller than the lower limit.

In step S131, the CPU 60 determines whether the flag F_UnderFlowOccur is in the ON state. If it is determined that the flag F_UnderFlowOccur is not in the ON state, the process goes to step S139. In step S139, it is determined whether T_UnderFlowPeriod is equal to or greater than Def_UnderFlowPeriod. T_UnderFlowPeriod represents the length of time in units of 4 ms (32 cycles) which has elapsed since F_UnderFlowOccur was turned on, and Def_UnderFlowPeriod has a default value in units of 4 ms (32 cycles) which is previously set by the user. In contrast to Def_SyncPeriod and Sam_SyncPeriod which are represented in units of frames of a video signal according to the NTSC or PAL standard, T_UnderFlowPeriod and Def_UnderFlowPeriod are represented in units of cycles. This allows the timing of inserting an empty packet to be controlled more precisely and also allows the interval at which empty packets are inserted to be specified over a wider range than is allowed in the case where the interval is specified only by Def_SyncPeriod and Sam_SyncPeriod.

In the case where it is determined in step S139 that T_UnderFlowPeriod is smaller than Def_UnderFlowPeriod, the process goes to step S141. In step S141, the CPU 60 adds 32 cycles to T_UnderFlowPeriod. As a result, T_UnderFlowPeriod is set to indicate the length of a period which has elapsed since the time at which the amount of data in a buffer reached the lower limit L.

If the above process is repeated in units of 32 cycles, the value of T_UnderFlowPeriod gradually increases and the value can finally become equal to or greater than Def_UnderFlowPeriod. In this case, the process goes from step S139 to S140 in which the CPU 60 turns on the flag F_UnderFlowOccur. That is, this flag indicates that the period, which has elapsed since the time at which the amount of data in the buffer reached the lower limit L, has become greater than Def_UnderFlowPeriod specified by the user.

If the flag F_UnderFlowOccur has been turned on via the above process, when step S131 is executed after a further lapse of 32 cycles, it is determined that the flag F_UnderFlowOccur is in the ON state, and thus the process goes to step S132. In step S132, it is determined whether the flag F_EmptyInsert is in the ON state. As described above, this flag is turned on in step S88 shown in FIG. 14. That is, if the value of Sam_SyncPeriod has not reached 3072/2, the flag F_EmtyInsert has not been turned on yet. In this case, no further processing is performed in the underflow preventing routine.

In the case where it is determined in step S132 that the flag F_EmptyInsert is in the ON state, the process goes to step S133 and the CPU 60 inserts one empty packet into the intermediate buffer for the flow #n. Because an empty packet has been inserted, the CPU 60 turns off the flag F_EmptyInsert in step S134.

Thereafter, in step S135, the CPU 60 determines whether the value of Sam_SyncPeriod has become equal to or greater than 3072. If the value of Sam_SyncPeriod is smaller than 3072, no further processing is performed in the underflow preventing routine.

When the flag F_UnderFlowOccur is in the ON state, the value of Sam_SyncPeriod is increased from one frame to next by steps S87 and S88 shown in FIG. 14. When the number of frames has reached the value specified by Def_SyncPeriod, the value of Sam_SyncPeriod becomes equal to 3072. If processing upon a further frame is started, the value of Sam_SyncPeriod becomes greater than 3072. In this case, the process goes from step S135 to S136 and the CPU 60 turns off the flag F_UnderFlowOccur. Furthermore, in steps S137 and S138, the values of Sam_SyncPeriod and T_UnderFlowPeriod are reset to 0.

Thereafter, the process returns to step S63 shown in FIG. 11.

When the DVCR 19-2 receives a CIP packet in the form of an isochronous packet via the IEEE-1394 serial bus 18-2, the DVCR 19-2 executes processing as shown in a flow chart of FIG. 18.

First, in step S151, the DVCR 19-2 detects a CIP located at the beginning of a frame. Thereafter, in step S152, the DVCR 19-2 extracts a time stamp described in a sync time field of the header of the CIP. Note that the sync time field has a valid value only in a CIP at the beginning of a frame.

In step S153, the difference between the value of the time stamp extracted in step S152 and the value (of low-order 16 bits) of the cycle time register at the time when that CIP was received is calculated. In step S154, the DVCR 19-2 reproduces a frame synchronization signal for a first frame at a time determined in accordance with the difference calculated in step S153.

In the above-described embodiment, IEEE-1394 serial buses and ATM networks are employed. However, the types of buses and networks are not limited to those employed in the embodiment, and other types of buses or networks may also be employed.

In the present description, the term "system" is used to represent an entire set of apparatuses.

The processing sequence described above may be executed by hardware or software. When the processing sequence is executed by software, a program forming the software may be installed from a storage medium onto a computer which is provided as dedicated hardware or may be installed onto a general-purpose computer capable of performing various processes in accordance with various programs installed thereon.

Specific examples of storage media usable for the above purpose include a magnetic disk (such as a floppy disk), an optical disk (such as a CD-ROM (Compact Disk-Read Only Memory) and a DVD (Digital Versatile Disk)), a magnetooptical disk (such as an MD (Mini-Disk)), and a semiconductor memory, in the form of a package medium on which a program is stored and which is supplied to a user separately from a computer. A program may also be supplied to a user by reinstalling it on a built-in ROM or a hard disk disposed in a computer.

In the present invention, the steps descried in the program stored in the program storage medium may be performed either in time sequence in accordance with the order described in the program or in a parallel or separate fashion.

As described above, in the data transfer apparatus, the data transfer method, and the storage medium according to the present invention, data, which has been received from the first network and which is to be transferred to the second network, is stored separately for the respective data flows, and the transferring of data to the second network is controlled in accordance with the amount of stored data of the respective data flows, and thus it is possible to transfer continuous data in real time without encountering an overflow and underflow and thus without creating a loss or excess of data.

What is claimed is:

1. A data transfer apparatus for transferring data between a first network and a second network, said data transfer apparatus comprising:

storage means for storing data separately for each data flow which has been received from said first network and which is to be transferred to said second network, the second network having a non-coincident bus cycle with respect to the first network;

detection means for detecting the degree of non-coincidence between said first and second network and amount of data stored in said storage means, for each data flow; and control means for controlling said data transferred to said second network in accordance with a detection result provided by said detection means.

2. A data transfer apparatus according to claim 1, wherein said first network and said second network are a wide area digital network and an IEEE-1394 serial bus, respectively.

3. A data transfer apparatus according to claim 1, wherein said control means starts reading said data from said storage means after the amount of data stored in said storage means has become equal to or greater than a predetermined threshold value.

4. A data transfer apparatus according to claim 1, wherein when the amount of data stored in said storage means has become equal to or greater than a predetermined threshold value, said control means discards dummy data included in said data stored in said storage means.

5. A data transfer apparatus according to claim 1, wherein when the amount of data stored in said storage means has become equal to or greater than a predetermined threshold value, said control means inserts dummy data into said data to be transferred to said second network.

6. A data transfer apparatus according to claim 1, wherein when said control means discards dummy data from said data stored in said storage means or inserts dummy data into the data to be transferred to said second network, said control means gradually corrects a deviation of a time stamp included in said data over a predetermined period of data units.

7. A data transfer apparatus according to claim 6, wherein said control means inserts or discards said dummy data at a substantially middle point of said period of data units during which the time stamp is corrected.

8. A data transfer apparatus according to claim 1, wherein said first network is connected to another first network which is not synchronous in terms of a network clock with the former first network.

9. A data transfer apparatus according to claim 1, wherein said data is video data or audio data including a temporally continuous content.

10. The data transfer apparatus of claim 1, wherein the detection result includes a determination as to a temporal difference between a bus cycle of said first network relative to a bus cycle of said second network.

11. A data transfer method for transferring data between a first network and a second network, said method comprising the steps of:

controlling the operation of storing data separately for each data flow which has been received from said first network and which is to be transferred to said second network, the second network having a non-coincident bus cycle with respect to the first network;

detecting the degree of non-coincidence between said first and second network and amount of data stored in said storage control step, for each data flow; and controlling the operation of transferring said data to said second network in accordance with a detection result obtained in said detection step.

12. The method of claim 11, wherein the detection result includes a determination as to a temporal difference between a bus cycle of said first network relative to a bus cycle of said second network.

13. A storage medium on which a computer-readable program for controlling a data transfer apparatus for transferring data between a first network and a second network is stored, said program comprising the steps of:

controlling the operation of storing data separately for each data flow which has been received from said first network and which is to be transferred to said second network, the second network having a non-coincident bus cycle with respect to the first network;

detecting the degree of non-coincidence between said first and second network and amount of data stored in said storage control step, for each data flow; and controlling the operation of transferring said data to said second network in accordance with a detection result obtained in said detection step.

14. The program of claim 13, wherein the detection result includes a determination as to a temporal difference between a bus cycle of said first network relative to a bus cycle of said second network.

15. A data transfer apparatus for transferring data between a first network and a second network, said data transfer apparatus comprising:

a memory configured to store data separately for each data flow which has been received from said first network and which is to be transferred to said second network, the second network having a non-coincident bus cycle with respect to the first network;

a detector configured to detect the degree of non-coincidence between said first and second network and amount of data stored in said memory, for each data flow; and a controller configured to control said data transferred to said second network in accordance with a detection result provided by said detector.

16. The data transfer apparatus of claim 15, wherein the detection result includes a determination as to a temporal difference between a bus cycle of said first network relative to a bus cycle of said second network.

* * * * *